(12) United States Patent
Ogasawara et al.

(10) Patent No.: US 8,743,256 B2
(45) Date of Patent: *Jun. 3, 2014

(54) SOLID-STATE IMAGE PICKUP ELEMENT, OPTICAL APPARATUS, SIGNAL PROCESSING APPARATUS, AND SIGNAL PROCESSING SYSTEM

(75) Inventors: Hidehiko Ogasawara, Chiba (JP); Toshiyuki Sekiya, Tokyo (JP)

(73) Assignee: Sony Corporation, Tokyo (JP)

( * ) Notice: Subject to any disclaimer, the term of this patent is extended or adjusted under 35 U.S.C. 154(b) by 362 days.

This patent is subject to a terminal disclaimer.

(21) Appl. No.: 12/747,404

(22) PCT Filed: Oct. 9, 2009

(86) PCT No.: PCT/JP2009/067599
§ 371 (c)(1),
(2), (4) Date: Jun. 10, 2010

(87) PCT Pub. No.: WO2010/041730
PCT Pub. Date: Apr. 15, 2010

(65) Prior Publication Data
US 2010/0265350 A1    Oct. 21, 2010

(30) Foreign Application Priority Data
Oct. 10, 2008 (JP) ................................ 2008-264574

(51) Int. Cl.
*H04N 5/335* (2011.01)
(52) U.S. Cl.
USPC .......................................... 348/308; 348/294
(58) Field of Classification Search
USPC .......................................... 348/294, 308, 295
See application file for complete search history.

(56) References Cited

U.S. PATENT DOCUMENTS

| 8,174,597 B2 * | 5/2012 | Ogasawara et al. ........... 348/294 |
| 2010/0091153 A1 | 4/2010 | Ogasawara et al. |
| 2012/0206634 A1 * | 8/2012 | Katzir et al. .................. 348/295 |

FOREIGN PATENT DOCUMENTS

| JP | 2003 111060 | 4/2003 |
| JP | 2004 219882 | 8/2004 |
| JP | 2004 222128 | 8/2004 |
| JP | 2006 196972 | 7/2006 |
| JP | 2006 261830 | 9/2006 |
| JP | 2008 5142 | 1/2008 |

* cited by examiner

*Primary Examiner* — Tuan Ho
(74) *Attorney, Agent, or Firm* — Oblon, Spivak, McClelland, Maier & Neustadt, L.L.P.

(57) ABSTRACT

The present invention relates to a solid-state image pickup element capable of transmitting pixel signals read from a pixel unit as optical signals at high speed, an optical apparatus, a signal processing apparatus, and a signal processing system.

The solid-state image pickup element 1A includes a pixel unit 10A which converts light into electric signals, an A/D convertor 11A which converts the signals read from the pixel unit 10A into digital signals, an optical communication unit 12A which converts the signals digitalized by the A/D convertor 11A into optical signals and outputs the optical signals, a timing generator 13A which generates a driving clock used to synchronize processes of inputting/outputting signals performed by the pixel unit 10A, the A/D convertor 11A, and the optical communication unit 12A, and a controller 16A which controls reading of signals.

12 Claims, 32 Drawing Sheets

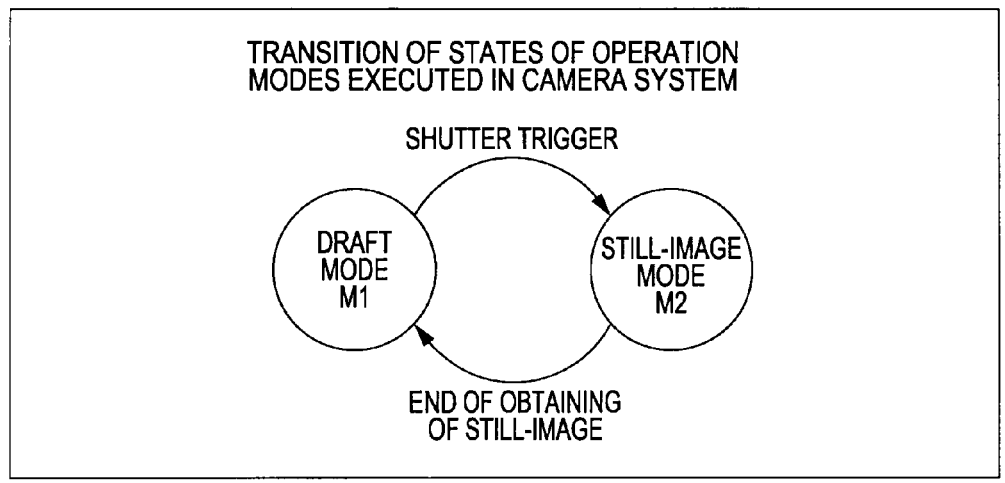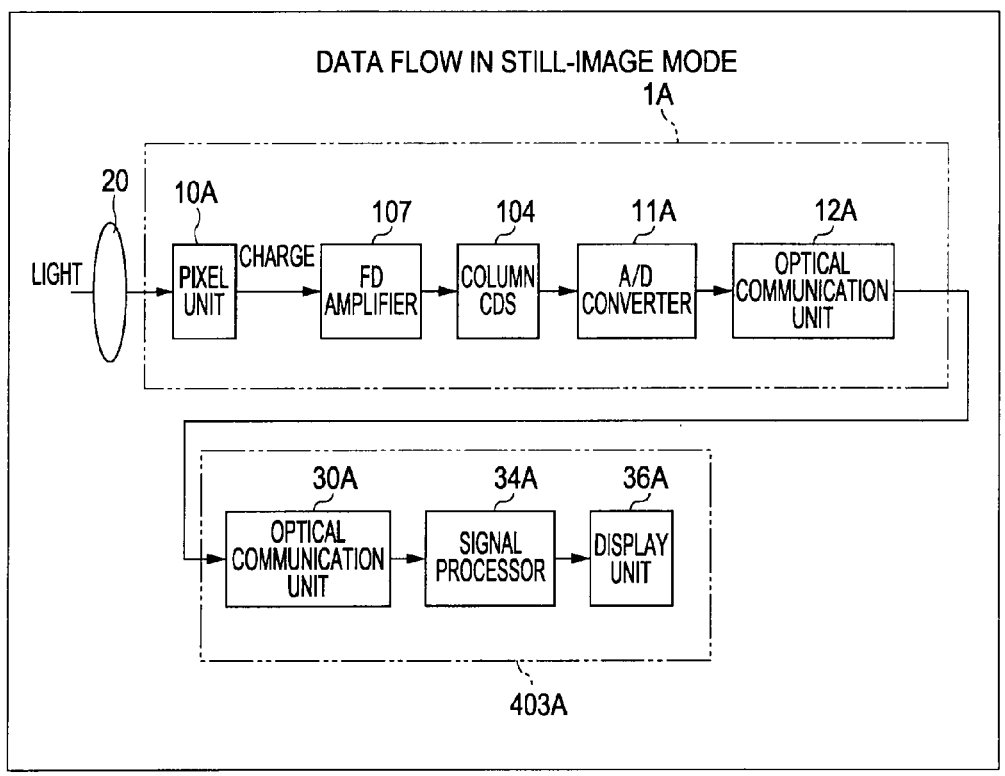

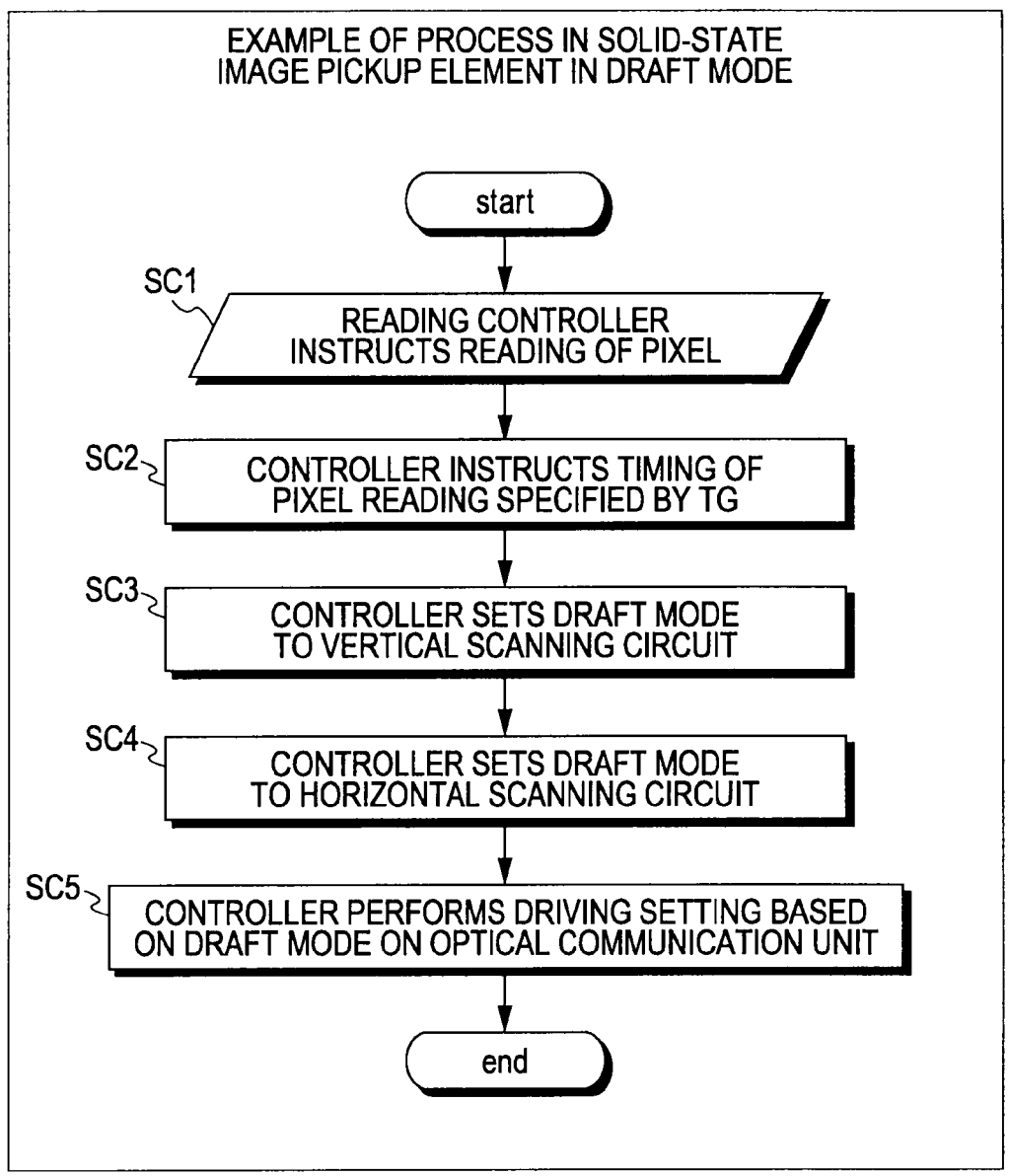

SOLID-STATE IMAGE PICKUP ELEMENT, OPTICAL APPARATUS, SIGNAL PROCESSING APPARATUS, AND SIGNAL PROCESSING SYSTEM

TECHNICAL FIELD

The present invention relates to a solid-state image pickup element, an optical apparatus including the solid-state image pickup element, a signal processing apparatus connected to the optical apparatus, and a signal processing system which includes the optical apparatus and the signal processing apparatus. Specifically, pixel signals read from the solid-state image pickup element are output as optical signals.

BACKGROUND ART

With speeding-up and high integration of circuit substrates, countermeasures for signal delay and generation of EMI have been demanded. An optical interconnection technique which has been attracting considerable attention addresses signal delay which is a problem caused by electric wiring, signal deterioration, and electromagnetic interference noise generated from the wiring, and enables high-speed transmission.

As a technique for high-speed signal transmission using light within a substrate, a technique referred to as an "optical interconnection" technique has been proposed (refer to Patent Document 1, for example). Patent Document 1 discloses a secondary optical waveguide layer, a semiconductor laser having oscillation modes switched from one to another, and an optical-path switching structure in which switches optical paths of light beams emitted from the semiconductor laser.

The optical-path switching structure is arranged such that a radiation angle is changed in the optical waveguide layer in accordance with a change of the oscillation mode of the semiconductor laser and emitted light is transmitted in the optical waveguide layer. Accordingly, a state of transmission of optical transmission signals in the secondary optical waveguide layer can be selected and degrees of freedom of arrangements of a light emitting element and a light receiving element are improved so that flexible reconfiguration of the light signal transmission is realized.

As a technique which applies such an optical interconnection technique to TFTs especially used for driving plain-surface displays, a technique which uses light for signal transmission to address signal delay caused by increase of sizes and large capacity display has been discussed.

On the other hand, a technique of transmitting a signal output from a solid-state image pickup element as light to a camera body unit which includes a detachable lens having the solid-state image pickup element has been proposed (refer to Patent Document 2, for example).

Patent Document 1: Japanese Unexamined Patent Application Publication No. 2004-219882
Patent Document 2: Japanese Unexamined Patent Application Publication No. 2006-196972

DISCLOSURE OF INVENTION

Technical Problem

However, in the technique disclosed in Patent Document 2, only a configuration in which a light emitting element is implemented in a substrate having an image pickup element implemented therein is disclosed, and a problem relating to high-speed transmission of signals has not been solved.

The present invention has been made in order to solve such a problem, and an object is to provide a solid-state image pickup element capable of transmitting pixel signals read from a pixel unit at high speed as optical signals, an optical apparatus including the solid-state image pickup element, a signal processing apparatus connected to the optical apparatus, and a signal processing system including the optical apparatus and the signal processing apparatus.

Technical Solution

To address the problem described above, a solid-state image pickup element according to the present invention includes a pixel unit which converts light into electric signals, an A/D convertor which converts signals read from the pixel unit into digital signals, an optical communication unit which converts the signals digitalized by the A/D convertor into optical signals and outputs the optical signals, a timing generator which generates a synchronization signal used to synchronize processes of inputting/outputting signals performed by the pixel unit, the A/D convertor, and the optical communication unit, and a controller which controls reading of signals.

An optical apparatus according to the present invention includes a solid-state image pickup element which converts incident light into electric signals and an optical element which accepts light to enter the solid-state image pickup element. The solid-state image pickup element includes a pixel unit which converts light into electric signals, an A/D convertor which converts signals read from the pixel unit into digital signals, an optical communication unit which converts the signals digitalized by the A/D convertor into optical signals and outputs the optical signals, a timing generator which generates a synchronization signal used to synchronize processes of inputting/outputting signals performed by the pixel unit, the A/D convertor, and the optical communication unit, and a controller which controls reading of signals. The pixel unit, the A/D convertor, the optical communication unit, the timing generator, and the controller are formed on a single substrate in an integrated manner as a single chip.

A signal processing apparatus according to the present invention includes a solid-state image pickup element which converts incident light into electric signals and an optical element which accepts light to enter the solid-state image pickup element. The solid-state image pickup element is connected to an optical apparatus including a pixel unit which converts light into electric signals, an A/D convertor which converts signals read from the pixel unit into digital signals, an optical communication unit which converts the signals digitalized by the A/D convertor into optical signals and outputs the optical signals, a timing generator which generates a synchronization signal used to synchronize processes of inputting/outputting signals performed by the pixel unit, the A/D convertor, and the optical communication unit, and a controller which controls reading of signals. The signal processing apparatus includes an optical communication unit which receives optical signals output from the optical communication unit included in the solid-state image pickup element, a reading controller which controls reading of signals from the pixel unit in the solid-state image pickup element, and a signal processor which processes signals which have been read from the pixel nit and which are input from the solid-state image pickup element through optical communication.

A signal processing system according to the present invention includes an optical apparatus including a solid-state image pickup element which converts incident light into electric signals and an optical element which accepts light to enter the solid-state image pickup element, and a signal processing apparatus connected to the optical apparatus. The solid-state image pickup element includes a pixel unit which converts light into electric signals, an A/D convertor which converts signals read from the pixel unit into digital signals, an optical communication unit which converts the signals digitalized by the A/D convertor into optical signals and outputs the optical signals, a timing generator which generates a synchronization signal used to synchronize processes of inputting/outputting signals performed by the pixel unit, the A/D convertor, and the optical communication unit, and a controller which controls reading of signals. The signal processing apparatus includes an optical communication unit which receives optical signals output from the optical communication unit included in the solid-state image pickup element, a reading controller which controls reading of signals from the pixel unit in the solid-state image pickup element, and a signal processor which processes signals which have been read from the pixel nit and which are input from the solid-state image pickup element through optical communication.

According to the present invention, electric signals obtained by performing photoelectric conversion on light incident on the solid-state image pickup element are read from the pixel unit in synchronization with a synchronization signal generated by the timing generator, and are input to the A/D convertor. The signals input to the A/D convertor are converted into digital signals, and the digital signals are output in synchronization with a synchronization signal generated by the timing generator, and are input to the optical communication unit. The digital signals input to the optical communication unit are converted into optical signals, and are output in synchronization with a synchronization signal generated by the timing generator.

Advantageous Effects

According to a solid-state image pickup element of the present invention, electric signals obtained by performing photoelectric conversion on incident light are converted into optical signals to be output while processes of inputting/outputting signals are synchronized with one another. Accordingly, high-speed transmission of signals read from the solid-state image pickup element is achieved. Furthermore, components are integrated as a single chip, reduction of space is realized. Moreover, design is facilitated, and high-speed transmission is more easily realized since transmission paths for electric signals may be made shorter.

According to an optical apparatus of the present invention, since the solid-state image pickup element is disposed, an image of light which has been captured by the solid-state image pickup element may be output as high-speed transmission. According to a signal processing apparatus of the present invention, since the optical apparatus is connected, the image of light which has been captured by the solid-state image pickup element is input as high-speed transmission, and accordingly, a large amount of data may be obtained.

According to a signal processing system of the present invention, since the optical apparatus and the signal processing apparatus are disposed, the image of light which has been captured by the solid-state image pickup element may be transmitted at high speed, and increase of the number of pixels of the solid-state image pickup element and increase of an amount of transmission data along with increase of a frame rate may be addressed.

BRIEF DESCRIPTION OF DRAWINGS

FIG. 3 is a flowchart illustrating a process performed when power is to be on.
FIG. 9 is a diagram illustrating change of states which shows examples of operation modes executed in a camera system.
FIG. 10 is a diagram illustrating data flow in a draft mode.
FIG. 11 is a flowchart illustrating an example of a process performed by the solid-state image pickup element in the draft mode.

BEST MODES FOR CARRYING OUT THE INVENTION

An embodiment of a solid-state image pickup element, an optical apparatus including the solid-state image pickup element, a signal processing apparatus connected to the optical apparatus, and a signal processing system including the optical apparatus and the signal processing apparatus will be described with reference to the accompanying drawings.

Outline of Solid-State Image Pickup Element of First Embodiment

Figure 1:
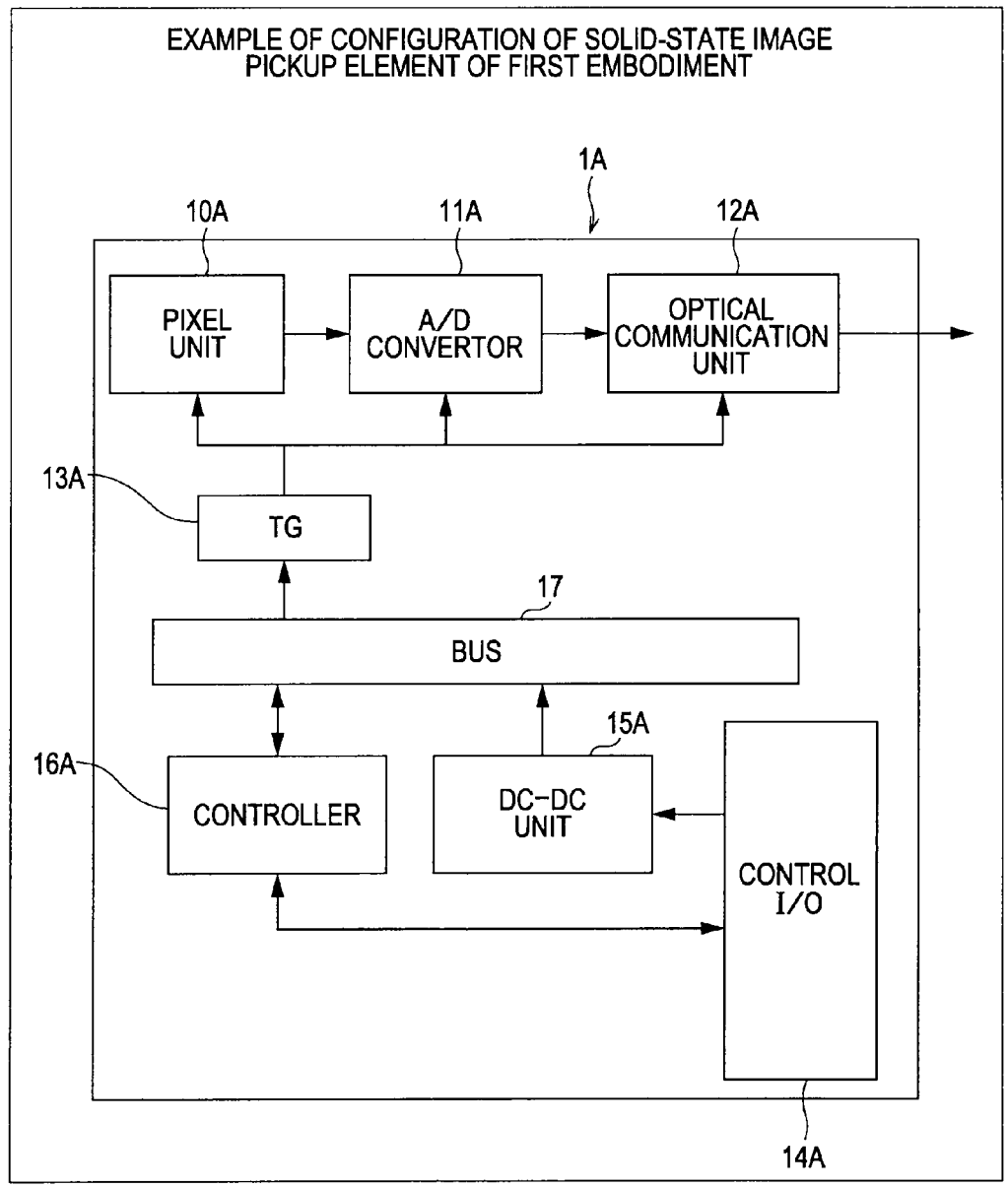
FIG. 1 is a function block diagram illustrating an outline of a solid-state image pickup element according to a first embodiment.

FIG. 1 is a function block diagram illustrating an outline of a solid-state image pickup element according to a first embodiment. A solid-state image pickup element 1A of the first embodiment is constituted by a CMOS (Complementary Metal Oxide Semiconductor) image sensor or a CCD (Charge Coupled Device) image sensor. The solid-state image pickup element 1A includes a pixel unit 10A which converts light into electric signals and outputs the electric signals and an A/D convertor 11A which converts the electric signals output from the pixel unit 10A into digital signals. The pixel unit 10A includes pixels which convert light into electric power, which are arranged in a two-dimensional manner or an one-dimensional manner, and which output electric signals in accordance with strength of the incident light.

The solid-state image pickup element 1A includes an optical communication unit 12A which converts the electric signals which have been digitalized by the A/D convertor 11A into optical signals and outputs the optical signals. The optical communication unit 12A includes a light emitting element such as a laser diode (LD) as a light emitting unit and outputs optical signals which have been modulated in accordance with the electric signals output from the A/D convertor 11A.

The solid-state image pickup element 1A includes a timing generator (TG) 13A which generates a driving clock (CLK) in accordance with an operation mode and which supplies the driving clock to various function blocks included in the A/D convertor 11A and the optical communication unit 12A. The solid-state image pickup element 1A further includes a control I/O 14A which performs input/output of control signals, for example, a DC-DC unit 15A which supplies electric power, and a controller 16A which controls reading of pixel data. The controller 16A, the DC-DC unit 15A, and the timing generator 13A are connected to a bus 17 and perform transmission/reception of the control signals and data. The solid-state image pickup element 1A does not require electrode used to externally transmit pixel signals as electric signals since the solid-state image pickup element 1A transmits the pixel signals in optical communication. Therefore, electrodes, not shown, connected to the control I/O 14A may include at least three electrodes including a power supply line, a GND line, and a control line.

The controller 16A controls the DC-DC unit 15A so as to turn on or turn off the solid-state image pickup element 1A. Furthermore, the controller 16A instructs the timing generator 13A to generate a driving clock, supply the driving clock to the pixel unit 10A, the A/D convertor 11A, and the optical communication unit 12A so that the pixel unit 10A, the A/D convertor 11A, and the optical communication unit 12A operate in synchronization with the driving clock.

Processes of inputting/outputting signals performed by the pixel unit 10A, the A/D convertor 11A, and the optical communication unit 12A are synchronized with one another in accordance with the driving clock supplied from the timing generator 13A. In the pixel unit 10A, pixel data is read in accordance with an image of incident light as electric signals. The pixel data read from the pixel unit 10A is input to the A/D convertor 11A, and is converted into digital signals to be output. The pixel data which have been digitalized by the A/D convertor 11A is input to the optical communication unit 12A, and converted into optical signals to be output.

Outline of Optical Apparatus of First Embodiment

Figure 2:
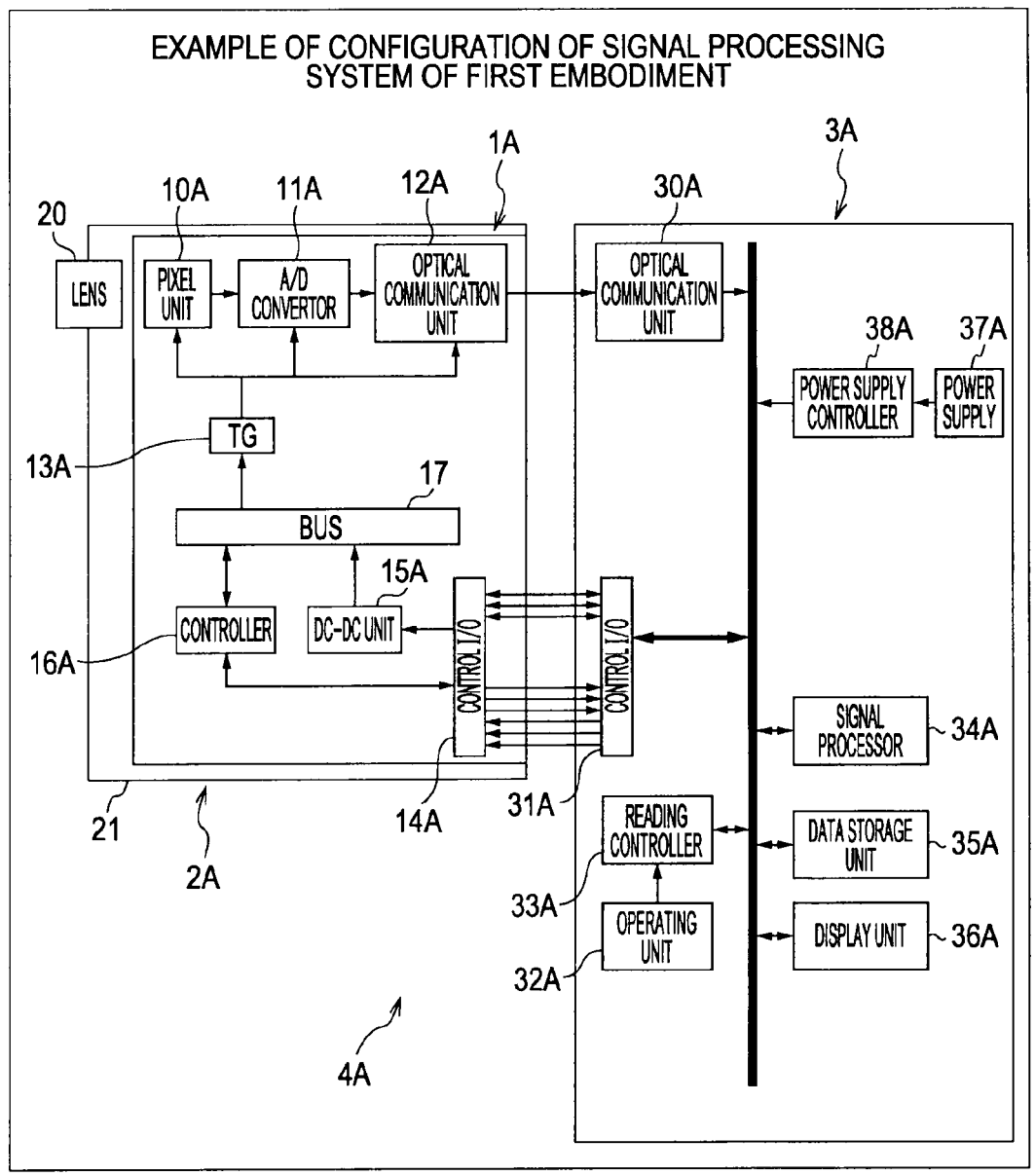
FIG. 2 is a function block diagram illustrating an outline of a signal processing system including an optical apparatus and a signal processing apparatus.

FIG. 2 is a function block diagram illustrating an outline of a signal processing system including an optical apparatus and a signal processing apparatus. First, an outline of the optical apparatus including the solid-state image pickup element will be described. An optical apparatus 2A of the first embodiment includes the solid-state image pickup element 1A, a lens unit 20, and a housing 21 in which the solid-state image pickup element 1A and the lens unit 20 are implemented. The lens unit 20 is an example of an optical element and is constituted by a single lens or a combination of a plurality of lenses.

In an optical apparatus 2A, the pixel unit 10A of the solid-state image pickup element 1A is located in a focus position of the lens unit 20, and an image of light entered through the lens unit 20 is formed in the pixel unit 10A of the solid-state image pickup element 1A.

The optical apparatus 2A includes a focusing mechanism which moves the lens unit 20 in an optical axis direction relative to the solid-state image pickup element 1A, for example, so that the focus position of the lens unit 20 corresponds to the pixel unit 10A of the solid-state image pickup element 1A irrespective of a distance to an object to be captured.

Outline of Signal Processing Apparatus of First Embodiment

Next, an outline of the signal processing apparatus will be described with reference to FIG. 2. A signal processing apparatus 3A of the first embodiment which is connected to the optical apparatus 2A described above includes an optical communication unit 30A which converts optical signals into electric signals and a control I/O 31A which performs input/output of control signals, for example. The optical communication unit 30A of the signal processing apparatus 3A is optically connected to the optical communication unit 12A of the solid-state image pickup element 1A when the optical apparatus 2A is connected to the signal processing apparatus 3A. Furthermore, the control I/O 31A is connected to the control I/O 14A of the solid-state image pickup element 1A.

The signal processing apparatus 3A includes an operating unit 32A which accepts an operation performed by a user and a reading controller 33A which instructs the solid-state image pickup element 1A of the optical apparatus 2A to read pixel data in accordance with the operation performed using the operating unit 32A.

The signal processing apparatus 3A instructs the solid-state image pickup element 1A of the optical apparatus 2A to read pixel data, and performs optical communication using the optical communication unit 30A of itself with the optical communication unit 12A of the solid-state image pickup element 1A so as to obtain the pixel data from the solid-state image pickup element 1A.

The optical communication unit 30A includes a light receiving element, such as a photodiode (PD), as a light receiving unit which receives optical signals output from the optical communication unit 12A of the solid-state image pickup element 1A and converts pixel data input as the optical signals into electric signals to be output.

The signal processing apparatus 3A includes a signal processor 34A which performs a certain signal process on the pixel data obtained through optical communication with the solid-state image pickup element 1A so as to generate image data. Furthermore, the signal processing apparatus 3A includes a data storage unit 35A which stores the pixel data obtained from the solid-state image pickup element 1A and a display unit 36A which displays an image representing the image data generated by the signal processor 34A.

The signal processing apparatus 3A includes a power supply 37A which supplies electric power to the signal processing apparatus 3A itself and the optical apparatus 2A, and a power supply controller 38A which controls the power supply. The power supply controller 38A performs a power supply controlling operation so that presence and absence of power supply to the signal processing apparatus 3A and presence and absence of power supply to the optical apparatus 2A are switched from one to another in a predetermined order in accordance with an operation of turning on/off the power supply.

Outline of Signal Processing System of First Embodiment

Next, an outline of the signal processing system will be described with reference to FIG. 2. A signal processing system 4A of the first embodiment includes the optical apparatus 2A and the signal processing apparatus 3A described above, and is configured such that the optical apparatus 2A is detachable from the signal processing apparatus 3A.

In the signal processing system 4A, the optical communication unit 30A of the signal processing apparatus 3A and the optical communication unit 12A of the solid-state image pickup element 1A included in the optical apparatus 2A are optically connected to each other when the optical apparatus 2A is connected to the signal processing apparatus 3A. Furthermore, the control I/O 31A of the signal processing apparatus 3A and the control I/O 14A of the solid-state image pickup element 1A are connected to each other.

In this way, in the signal processing system 4A, data is input/output as optical signals between the optical apparatus 2A and the signal processing apparatus 3A using the optical communication unit 12A of the solid-state image pickup element 1A and the optical communication unit 30A of the signal processing apparatus 3A.

Furthermore, in the signal processing system 4A, control signals are input/output between the signal processing apparatus 3A and the optical apparatus 2A using the control I/O 31A of the signal processing apparatus 3A and the control I/O 14A of the solid-state image pickup element 1A.

In the signal processing system 4A, the operating unit 32A of the signal processing apparatus 3A accepts an operation performed by the user, and in accordance with the operation performed using the operating unit 32A, the reading controller 33A of the signal processing apparatus 3A outputs a control signal for instructing reading of pixel data.

In the signal processing system 4A, the control signal for instructing reading of pixel data is input to the solid-state image pickup element 1A of the optical apparatus 2A through the control I/O 31A of the signal processing apparatus 3A and the control I/O 14A of the optical apparatus 2A.

In the signal processing system 4A, when the control signal for instructing reading of pixel data is input to the solid-state image pickup element 1A of the optical apparatus 2A, the controller 16A of the solid-state image pickup element 1A controls the timing generator 13A to generate a driving clock.

The driving clock generated using the timing generator 13A is supplied to the pixel unit 10A, the A/D convertor 11A, and the optical communication unit 12A. The pixel unit 10A reads pixel data as electric signals. The pixel data read from the pixel unit 10A is input to the A/D convertor 11A and is converted into digital signals to be output. The pixel data digitized using the A/D convertor 11A is input to the optical communication unit 12A and is converted into optical signals to be output.

In the signal processing system 4A, the pixel data read in the solid-state image pickup element 1A is input into the signal processing apparatus 3A through optical communication using the optical communication unit 12A of the solid-state image pickup element 1A and the optical communication unit 30A of the signal processing apparatus 3A.

In the signal processing system 4A, when the pixel data read in the solid-state image pickup element 1A is input into the signal processing apparatus 3A, the optical communication unit 30A of the signal processing apparatus 3A converts the pixel data input as optical signals into electric signals to be output.

In the signal processing system 4A, the signal processor 34A of the signal processing apparatus 3A performs a certain signal process on the pixel data which has been converted into the electric signals using the optical communication unit 30A of the signal processing apparatus 3A so as to generate image data, and an image is displayed in the display unit 36A, for example.

Example of Power Supply Control of Signal Processing System of First Embodiment

Figure 3:
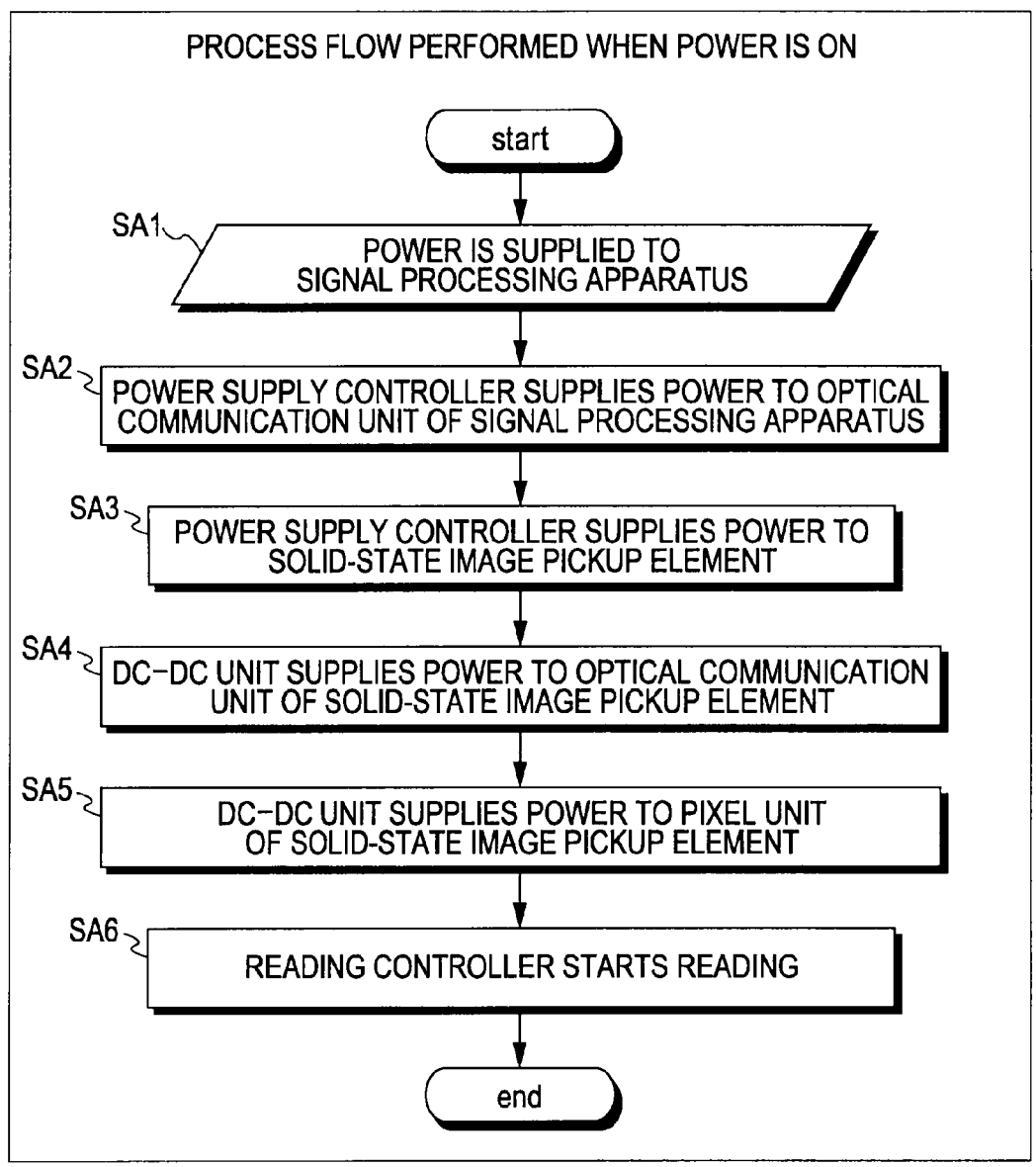
Figure 4:
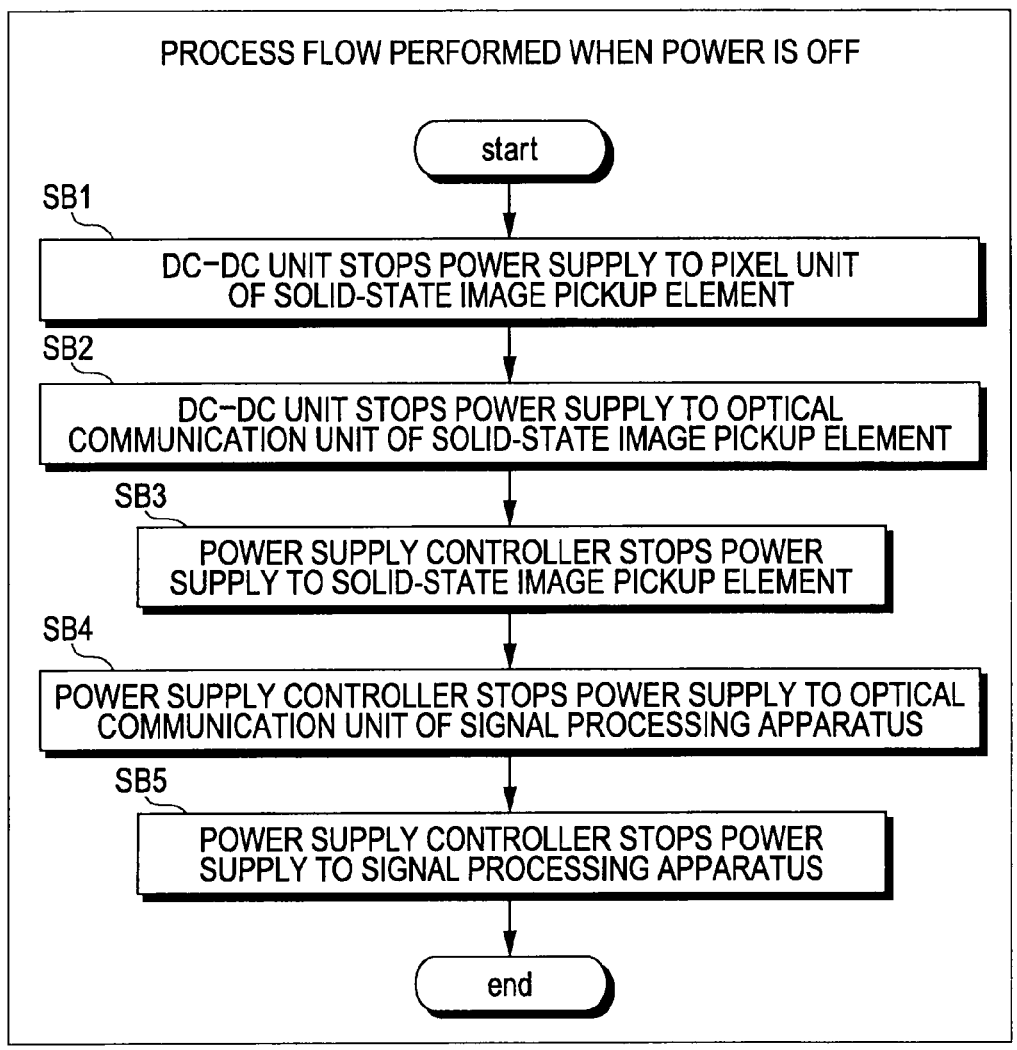
FIG. 4 is a flowchart illustrating a process performed when the power is to be off.

FIG. 3 is a flowchart illustrating a process performed when power is to be on. FIG. 4 is a flowchart illustrating a process performed when the power is to be off. An example of power supply control when the power is to be on and when the power is to be off will now be described.

First, a process performed when the power is to be on will be described with reference to the drawings. In the signal processing system 4A, when the power is to be on, power supply control is performed such that the signal processing apparatus 3A and the solid-state image pickup element 1A of the optical apparatus 2A are turned on in this order, and the optical communication unit 30A on a light receiving side and the optical communication unit 12A on a light emitting side are turned on in this order.

Specifically, when the power supply of the signal processing system 4A is turned on using a switch of the power supply, not shown, electric power is supplied to the signal processing apparatus 3A in step SA1 of FIG. 3. When the power is supplied to the signal processing apparatus 3A, the power supply controller 38A of the signal processing apparatus 3A supplies the electric power to the optical communication unit 30A of the signal processing apparatus 3A in step SA2 of FIG. 3.

After supplying the electric power to the optical communication unit 30A of the signal processing apparatus 3A, the power supply controller 38A of the signal processing apparatus 3A supplies the electric power to the solid-state image pickup element 1A of the optical apparatus 2A in step SA3 of FIG. 3.

In the signal processing system 4A having the configuration shown in FIG. 2, the power supply 37A is included in the signal processing apparatus 3A, and the signal processing apparatus 3A supplies the electric power to the optical apparatus 2A using the control I/O 31A of the signal processing apparatus 3A and the control I/O 14A of the solid-state image pickup element 1A.

When receiving the electric power supplied from the signal processing apparatus 3A, the DC-DC unit 15A of the solid-state image pickup element 1A supplies the electric power to the optical communication unit 12A of the solid-state image pickup element 1A in step SA4 of FIG. 3. Specifically, the electric power is supplied to a driving unit included in the optical communication unit 12A which will be described hereinafter, and thereafter, the electric power is supplied to a light emitting unit included in the optical communication unit 12A which will be described hereinafter. Accordingly, malfunction of an output stage which occurs when the electric power is supplied to the light emitting unit in a state in which the output stage of the driving unit of the optical communication unit 12A is in an unstable state and malfunction of the light emitting unit caused due to excessively supplied current may be prevented. Thereafter, in step SA5 of FIG. 3, the power is supplied to the function blocks, such as the pixel unit 10A, which are used to perform an image pickup operation. By supplying the electric power in this order when the solid-state image pickup element 1A is to be turned on, malfunction and breakdown of an input stage of the driving unit which occur when pixel data is input to the optical communication unit 12A before the optical communication unit 12A enters a driving-available state may be prevented.

In this way, the optical communication unit 30A of the signal processing apparatus 3A on the light receiving side and the optical communication unit 12A of the solid-state image pickup element 1A on the light emitting side are turned on in this order.

As described above, when the electric power is supplied from the light receiving side to the light emitting side, the reading controller 33A of the signal processing apparatus 3A outputs a control signal which instructs reading of pixel data, and the reading of the pixel data from the solid-state image pickup element 1A is started.

Next, a process performed when the power is to be turned off will be described with reference to the drawings. In the signal processing system 4A, when the power is to be turned off, the power supply control is performed such that power supply to the solid-state image pickup element 1A of the optical apparatus 2A and power supply to the signal processing apparatus 3A are stopped in this order, and power supply to the optical communication unit 12A on the light emitting side and power supply to the optical communication unit 30A on the light receiving side are stopped in this order.

Specifically, when an operation of turning off the signal processing system 4A is performed using the power-supply switch, not shown, the power supply controller 38A of the signal processing apparatus 3A outputs a control signal used to perform a process of stopping power supply to the solid-state image pickup element 1A to the optical apparatus 2A. In response to the control signal used to perform the process of stopping power supply, the DC-DC unit 15A of the solid-state image pickup element 1A stops power supply to the function blocks, such as the pixel unit 10A of the solid-state image pickup element 1A, used to perform the image pickup operation in step SB1 of FIG. 4. After power supply to the pixel unit 10A and the like is stopped, power supply to the optical communication unit 12A of the solid-state image pickup element 1A is stopped in a process of step SB2. By stopping power supply to the solid-state image pickup element 1A in this order, malfunction and breakdown of the input stage of the driving unit of the optical communication unit 12A which occur when pixel data is input to the optical communication unit 12A in a state in which the optical communication unit 12A is in an driving-unavailable state can be prevented. In the optical communication unit 12A, after the power supply to the light emitting unit is stopped, the power supply to the driving unit is stopped. By this, as is the case where the power is turned on, malfunction of the output stage which occurs when the power is continued to be supplied to the light emitting unit in a state in which the output stage of the driving unit of the optical communication unit 12A is in an unstable state and malfunction and breakdown of the light emitting unit caused by excessively supplied current can be prevented.

After stopping the power supply to the optical communication unit 12A of the solid-state image pickup element 1A, the power supply controller 38A of the signal processing apparatus 3A stops power supply to the solid-state image pickup element 1A in a process of step SB3 shown in FIG. 4.

After stopping the power supply to the solid-state image pickup element 1A, the power supply controller 38A of the signal processing apparatus 3A stops power supply to the optical communication unit 30A of the signal processing apparatus 3A in a process of step SB4 shown in FIG. 4.

In this way, the power supply to the optical communication unit 12A of the solid-state image pickup element 1A on the light emitting side and the optical communication unit 30A of the signal processing apparatus 3A on the light receiving side is stopped in this order.

As described above, when the power supply to the light emitting side and the light receiving side is stopped in this order, the power supply controller 38A of the signal processing apparatus 3A stops power supply to the signal processing apparatus 3A in a process of step SB5 shown in FIG. 4.

Concrete Example of Solid-State Image Pickup Element of First Embodiment

Figure 5:
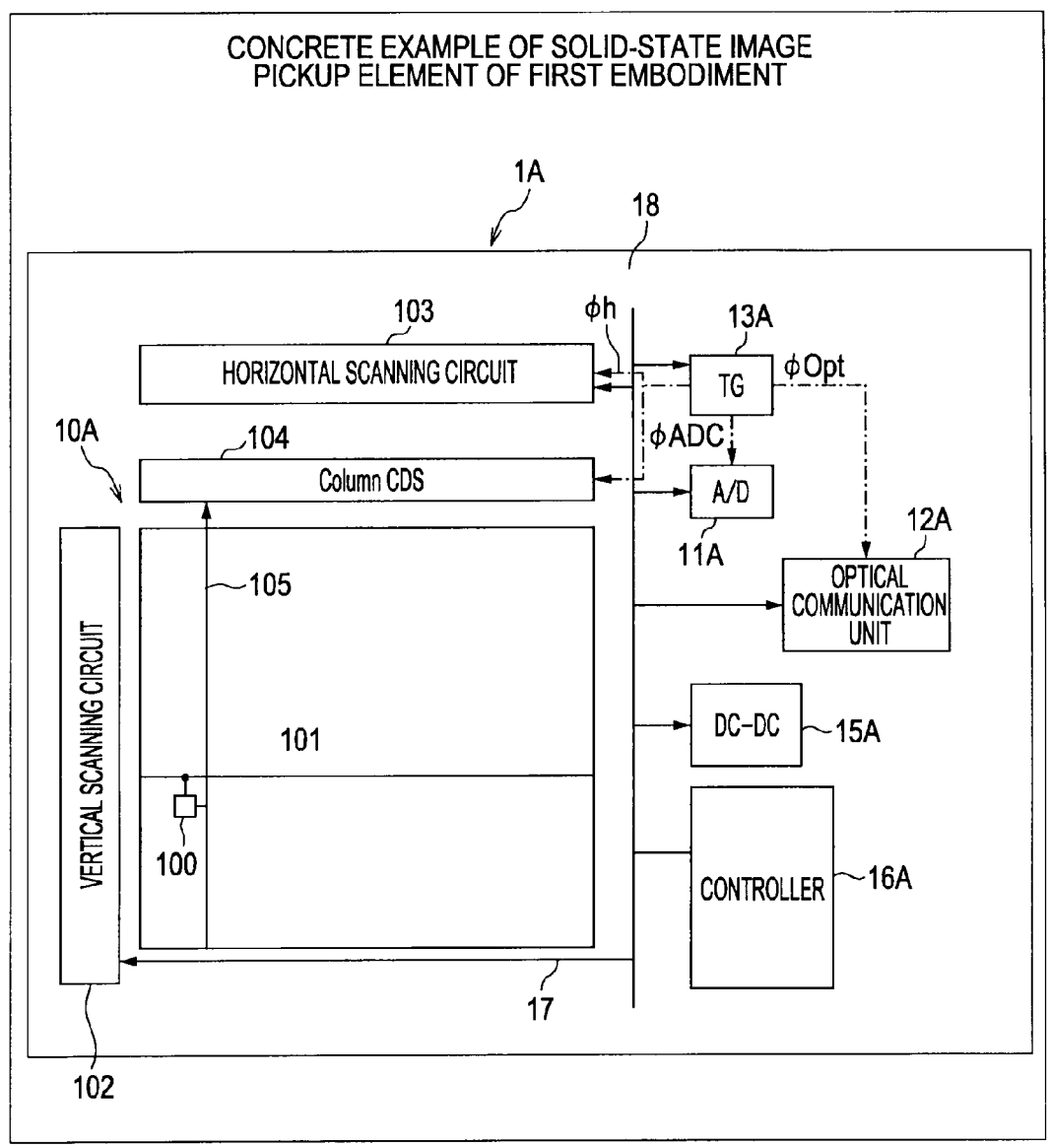
FIG. 5 is a function block diagram illustrating a solid-state image pickup element according to the first embodiment in detail.

FIG. 5 is a function block diagram illustrating the solid-state image pickup element according to the first embodiment in detail. In a description hereinafter, the solid-state image pickup element 1A is constituted by a CMOS image sensor.

The pixel unit 10A of the solid-state image pickup element 1A constituted by the CMOS image sensor includes a pixel array 101 including pixels 100 arranged in a matrix, a vertical scanning circuit 102 and a horizontal scanning circuit 103 which are used to select some of the pixels 100 which are used to read pixel data in an XY address method.

The vertical scanning circuit (Row Decoder/Driver) 102 selects some of the pixels 100 which are used to select pixel data in a row direction of the pixel array 101. Furthermore, the vertical scanning circuit 102 generates a row selection pattern for each operation mode, and selects some of the pixels 100 which are used to read pixel data in accordance with the generated selection pattern.

The horizontal scanning circuit (Column Decoder/Driver) 103 selects some of the pixels 100 which are used to read pixel data in a column direction of the pixel 100. Furthermore, the horizontal scanning circuit 103 generates a column selection pattern for each operation mode, and selects some of the pixels 100 which are used to read pixel data in accordance with the generated selection pattern. Furthermore, the horizontal scanning circuit 103 performs calculation such as addition of pixels arranged in a horizontal direction, and performs parallel/serial conversion on an array of signals output from the pixels 100.

The solid-state image pickup element 1A includes a column CDS circuit 104 which removes noise from pixel data. The CDS (Correlated Double Sampling) circuit samples a reference (resetting) level and a signal level included in a signal and obtains a difference therebetween by performing subtraction. The column CDS circuit 104 is connected to row signal lines 105 which are used to output the pixel data from the pixel array 101, and removes variation of amplification for each pixel 100. The column CDS circuit 104 performs processing while analog signals are processed as analog signals.

In the solid-state image pickup element 1A, the vertical scanning circuit 102 and the horizontal scanning circuit 103 which have been described above and which are included in the pixel unit 10A are connected to the bus 17. Furthermore, the A/D convertor 11A, the optical communication unit 12A, the timing generator 13A, the DC-DC unit 15A, and the controller 16A which have been described above are connected to the bus 17.

Then, a driving clock φh generated by the timing generator 13A is supplied to the horizontal scanning circuit 103 and the column CDS circuit 104. Furthermore, a driving clock φADC is supplied to the A/D convertor 11A. Moreover, a driving clock φOpt is supplied to the optical communication unit 12A.

The solid-state image pickup element 1A is configured such that the pixel unit 10A, the A/D convertor 11A, the optical communication unit 12A, the timing generator 13A, the DC-DC unit 15A, and the controller 16A are disposed on a substrate 18 such as a silicon substrate. The solid-state image pickup element 1A is configured as a single chip such that these components are disposed through a semiconductor fabrication process. Furthermore, in the solid-state image pickup element 1A, the electrodes, not shown, which are described with reference to FIG. 1 and which are connected to the control I/O 14A are formed on a front surface or a back surface of the substrate 18.

Figure 6:
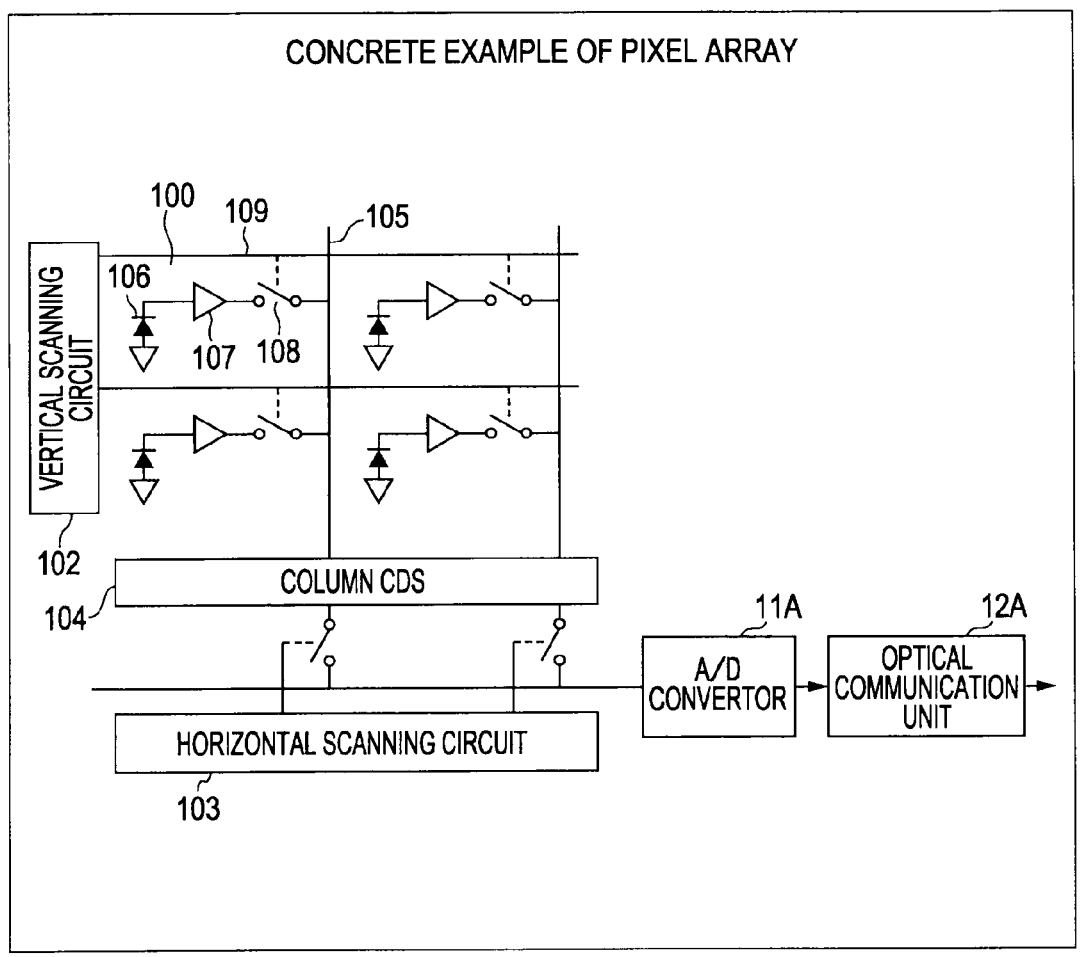
FIG. 6 is a diagram illustrating a circuit configuration of a pixel array in detail.
Figure 7:
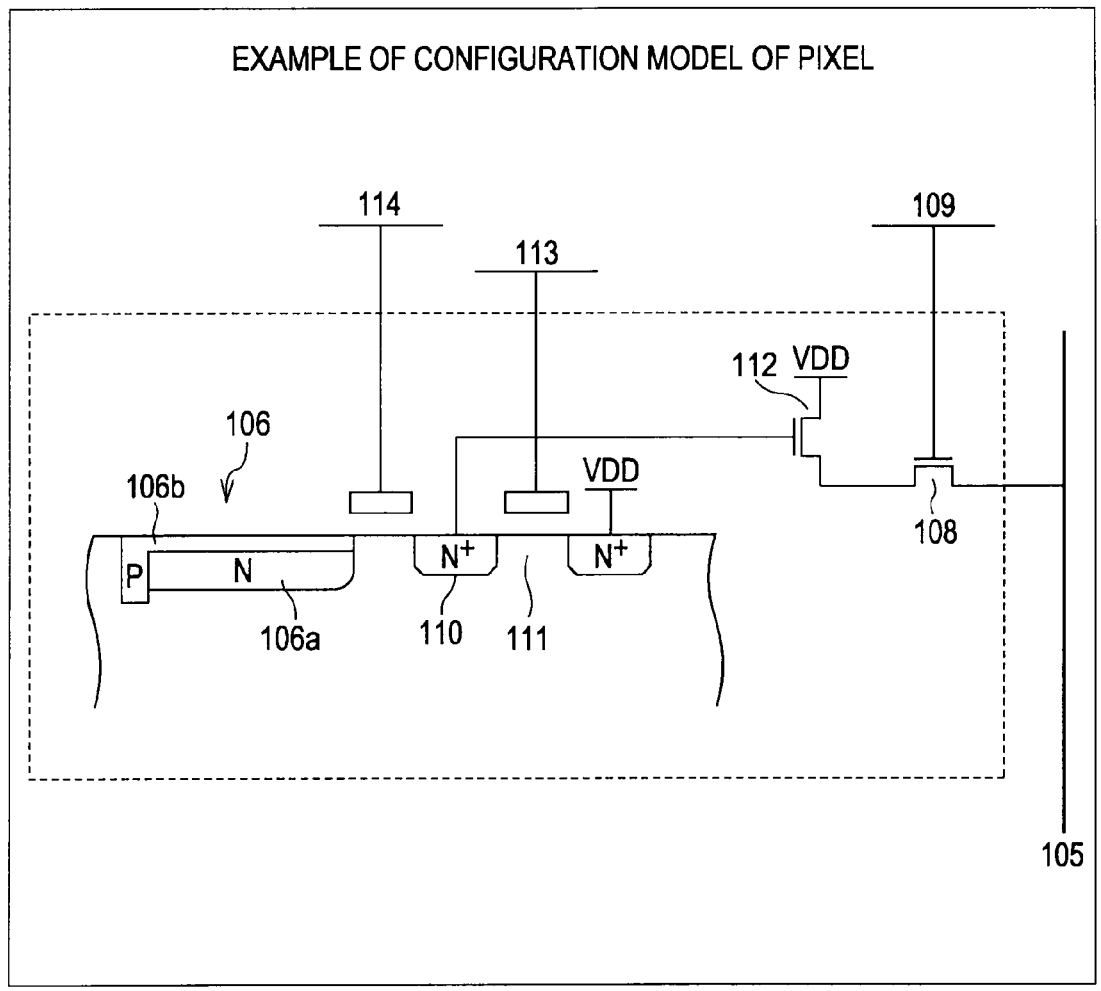
FIG. 7 is a sectional configuration view illustrating an example of a configuration model of a pixel.

In FIGS. 6 and 7, a configuration of one of the pixels and a configuration for reading a pixel signal will be described. FIG. 6 is a diagram illustrating a circuit configuration of the pixel array. FIG. 7 is a sectional configuration view illustrating an example of a configuration model of one of the pixels.

Each of the pixels 100 includes a photodiode (PD) 106 which converts light into electric power (signal charge), an FD amplifier 107 which amplifies an electric signal, and a row selection transistor (Tr) 108 which constitutes a row selection switch. In each of the pixels 100, the vertical scanning circuit 102 switches an on state and an off state of the row selection transistor 108 from one to another through a corresponding one of row selection lines 109, and an electric signal amplified by the FD amplifier 107 is output to the column signal line 105.

The FD amplifier 107 includes a charge detector (FD) 110, a resetting transistor 111, and an amplification transistor 112, and has a function of amplifying charge which is obtained through photoelectric conversion in a storage period.

Specifically, in the FD amplifier 107, after the storage period is terminated, the charge detector 110 is reset through a resetting line 113 which constitutes a resetting gate (Rst) before a signal is output. Since a voltage of the reset charge detector 110 is connected to the gate of the amplification transistor 112, a resetting level obtained when any signal is not supplied is output to the column signal line 105 from the source of the amplification transistor 112.

Immediately thereafter, when a signal charge is read from the photodiode 106 through a row reading line 114 which constitutes a reading gate (Rd) and the row reading line 114 is closed after the transmission, a voltage of the charge detector 110 is changed by intensity of light encountered on the photodiode 106. Therefore, a signal level obtained when a signal is supplied is output from the amplification transistor 112 to the column signal line 105.

Note that the photodiode 106 shown in FIG. 7 has a configuration referred to as an embedded photodiode in which a P-layer region 106b is formed on a surface of an N-layer region 106a. The P-layer region 106b suppresses generation of dark current, and FPN (Fixed Pattern Noise) caused by the dark current is improved.

Concrete Example of Signal Processing System of First Embodiment

Figure 8:
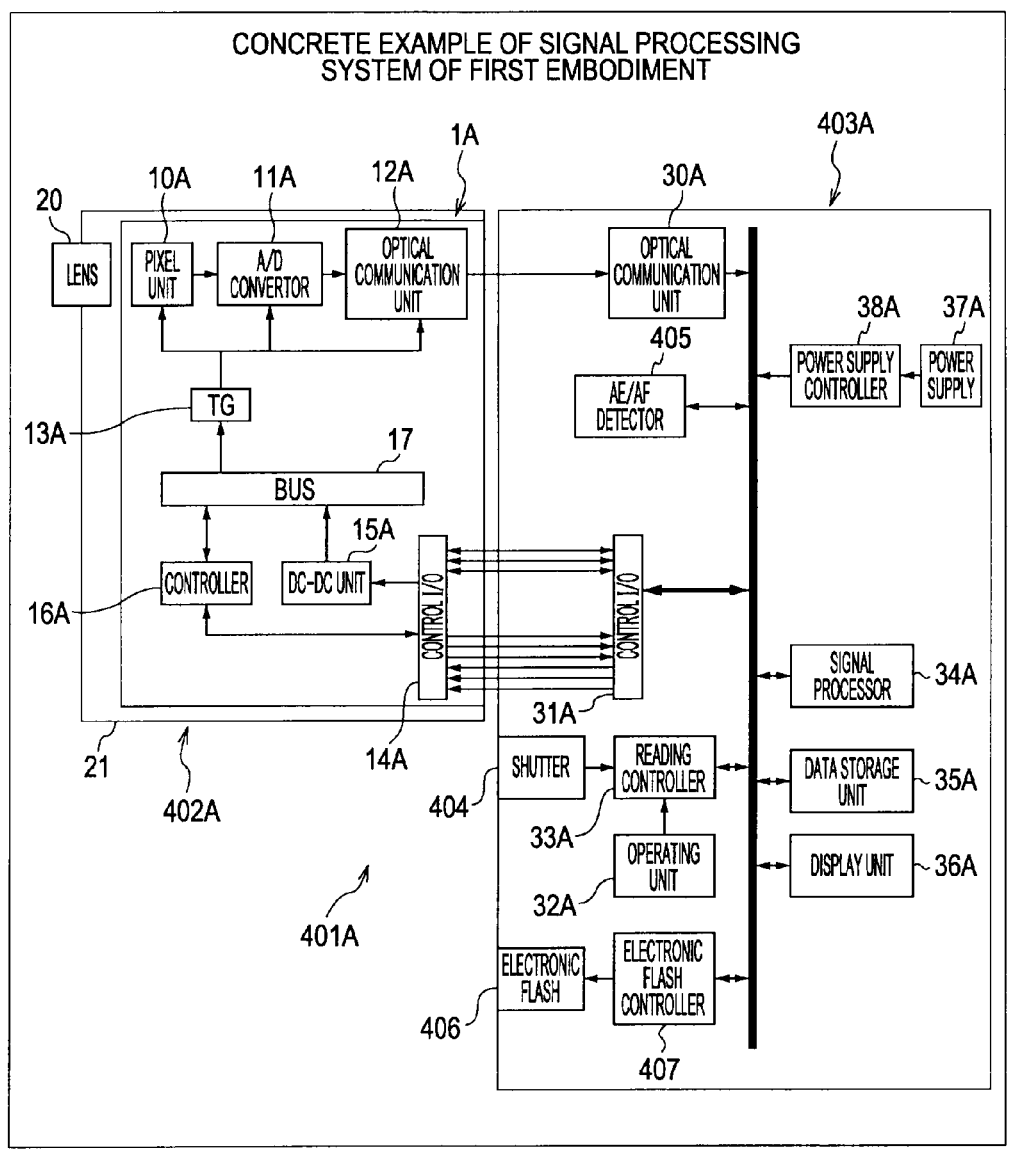
FIG. 8 is a function block diagram illustrating the signal processing system according to the first embodiment in detail.

FIG. 8 is a function block diagram illustrating the signal processing system according to the first embodiment in detail. As the signal processing system 4A employing the CMOS image sensor as the solid-state image pickup element 1A, a camera system 401A is configured.

The camera system 401A includes a lens unit 402A serving as the optical apparatus 2A described with reference to FIG. 2 and a camera body unit 403A serving as the signal processing apparatus 3A described with reference to FIG. 2. The camera body unit 403A includes, in addition to the configuration described with reference to FIG. 2, a shutter 404 which performs image pickup, an AE/AF detector 405 which performs photometry and ranging, an electronic flash 406 which emits auxiliary light, and an electronic flash controller 407. The camera system 401A performs a demosaic process and a camera signal process using the signal processor 34A of the camera body unit 403A.

Pixel Signal Reading Operation of Camera System

Next, an operation of reading a pixel signal performed by the camera system 401A will be described with reference to the drawings.

(1) An image of light incident on the lens unit 402A is formed using the lens unit 20, and enters the pixel unit 10A of the solid-state image pickup element 1A.

(2) When the light is incident on the pixels 100 of the pixel unit 10A, photoelectric conversion is performed, and storage of charge is started.

(3) A storage period is controlled in accordance with a period of time in which exposure is controlled using an electronic shutter or a mechanical shutter, and the charge storage period is terminated.
(4) The vertical scanning circuit 102 selects one of the row selection lines 109 used to read signals.
(5) The charge detector 110 is reset using the resetting line 113 and a resetting level is read. The read resetting level is amplified by the FD amplifier 107.
(6) The resetting level is stored in the column CDS circuit 104.
(7) A signal charge is read from the photodiode 106 through the row reading line 114 to the charge detector 110. The read signal charge is amplified by the FD amplifier 107.
(8) A signal level is stored in the column CDS circuit 104.
(9) In the column CDS circuit 104, subtraction is performed using the signal level and the resetting level.
(10) Pixel signals are obtained from the column CDS circuit 104 for individual rows by successively selecting columns by the horizontal scanning circuit 103.
(11) The obtained pixel signals are subjected to A/C conversion using the A/D convertor 11A, and are transmitted to the optical communication unit 12A of the solid-state image pickup element 1A.
(12) The optical communication unit 12A of the solid-state image pickup element 1A performs light modulation in accordance with input digital signals.

By sequentially performing the procedure including the operations (4) to (12) described above for individual rows by the vertical scanning circuit 102, an image (still image) is obtained from the image of the light incident on the solid-state image pickup element 1A.

Example of Operation Mode in Camera System

FIG. 9 is a diagram illustrating change of states which shows examples of operation modes executed in the camera system. Examples of operation modes executed by the camera system 401A include a pixel calculation mode in which calculation is performed among adjacent pixels in addition to a draft mode and a still-image mode which will be described hereinafter. The pixel calculation mode may be used for differentiation, integration, feature amount extraction, gravity extraction, counting, and measurement, for example. Furthermore, other examples of operation modes include a pixel addition mode which is a substitute of thinning-out selection, a frame addition mode, and a recognition mode in which a recognition parameter representatively used in face recognition is calculated, for example. Next, among the operation modes executed by the camera system 401A, the draft mode and the still-image mode will be described as examples hereinafter. The camera system 401A operates in a draft mode M1 in which a moving image of a low resolution is output and a still-image mode M2 in which a still image of a high resolution is output. The camera system 401A executes the draft mode M1 when an operation of determining composition is performed before image pickup, and executes the still-image mode M2 in response to a shutter trigger generated when a shutter is pressed to thereby enter the still-image mode M2 from the draft mode M1. After the image pickup is performed in the still-image mode M2 and a still image is captured, the draft mode M1 is executed, that is, the still-image mode M2 is changed to the draft mode M1.

Example of Operation in Draft Mode

FIG. 10 is a diagram illustrating data flow in the draft mode. FIG. 11 is a flowchart illustrating an example of a process performed by the solid-state image pickup element in the draft mode. The draft mode will now be described in detail.

First, data flow in the draft mode will be described. The camera system 401A selects certain pixels from among all the pixels and instructs reading of pixel data. In the solid-state image pickup element 1A, an image of light entered from the lens unit 20 is subjected to photoelectric conversion by the pixel unit 10A. Signal charges read from the pixels which have been instructed to be read are amplified by the FD amplifier 107, and noise is removed by the column CDS circuit 104. The pixel data read from the pixel unit 10A is subjected to A/D conversion by the A/D convertor 11A and converted into optical signals by the optical communication unit 12A to be output.

The solid-state image pickup element 1A and the camera body unit 403A perform optical communication of data therebetween through the optical communication unit 12A and the optical communication unit 30A. The optical signals output from the optical communication unit 12A of the solid-state image pickup element 1A are input into the optical communication unit 30A of the camera body unit 403A.

The optical signals representing the pixel data input to the optical communication unit 30A of the camera body unit 403A are converted into electric signals. The electric signals are subjected to a demosaic process and a camera signal process by the signal processor 34A and displayed in the display unit 36A.

Next, a process performed by the solid-state image pickup element 1A which executes the draft mode will be described. The solid-state image pickup element 1A receives an instruction for reading pixels in the draft mode from the reading controller 33A of the camera body unit 403A in step SC1 of FIG. 11.

The controller 16A of the solid-state image pickup element 1A instructs a timing when pixels are read which is specified by the timing generator 13A in step SC2 of FIG. 11. The controller 16A sets the draft mode to the vertical scanning circuit 102 in step SC3 of FIG. 11. Furthermore, the controller 16A sets the draft mode to the horizontal scanning circuit 103 in step SC4 of FIG. 11.

In the processes in step SC3 and step SC4, settings of thinning-out and addition of the pixels, for example, are performed, the vertical scanning circuit 102 generates a pattern of selection of rows to be read in the draft mode so that pixels used to read pixel data are selected in accordance with the generated selection pattern. The horizontal scanning circuit 103 generates a pattern of selection of columns to be read in the draft mode so that pixels used to read pixel data are selected in accordance with the generated selection pattern.

The controller 16A performs a setting of driving in accordance with the draft mode to the optical communication unit 12A in step SC5 of FIG. 11. In the solid-state image pickup element 1A, since a degree of reduction of the total number of pixels to be read is considerably varied depending on the setting of the draft mode, a bit rate of data to be output should be appropriately controlled at a timing of horizontal scanning. Therefore, the driving setting is performed for the optical communication unit 12A in accordance with the bit rate appropriately controlled.

Example of Operation in Still-Image Mode

Figure 12:
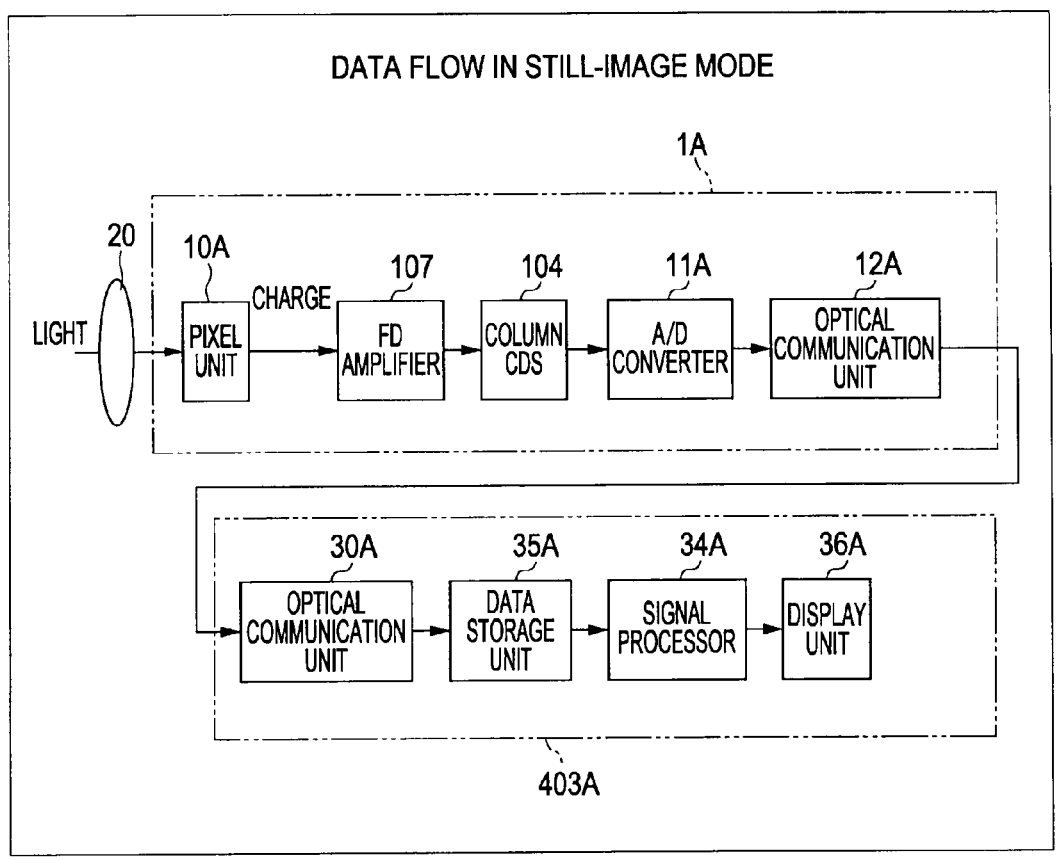
FIG. 12 is a diagram illustrating data flow in a still-image mode.
Figure 13:
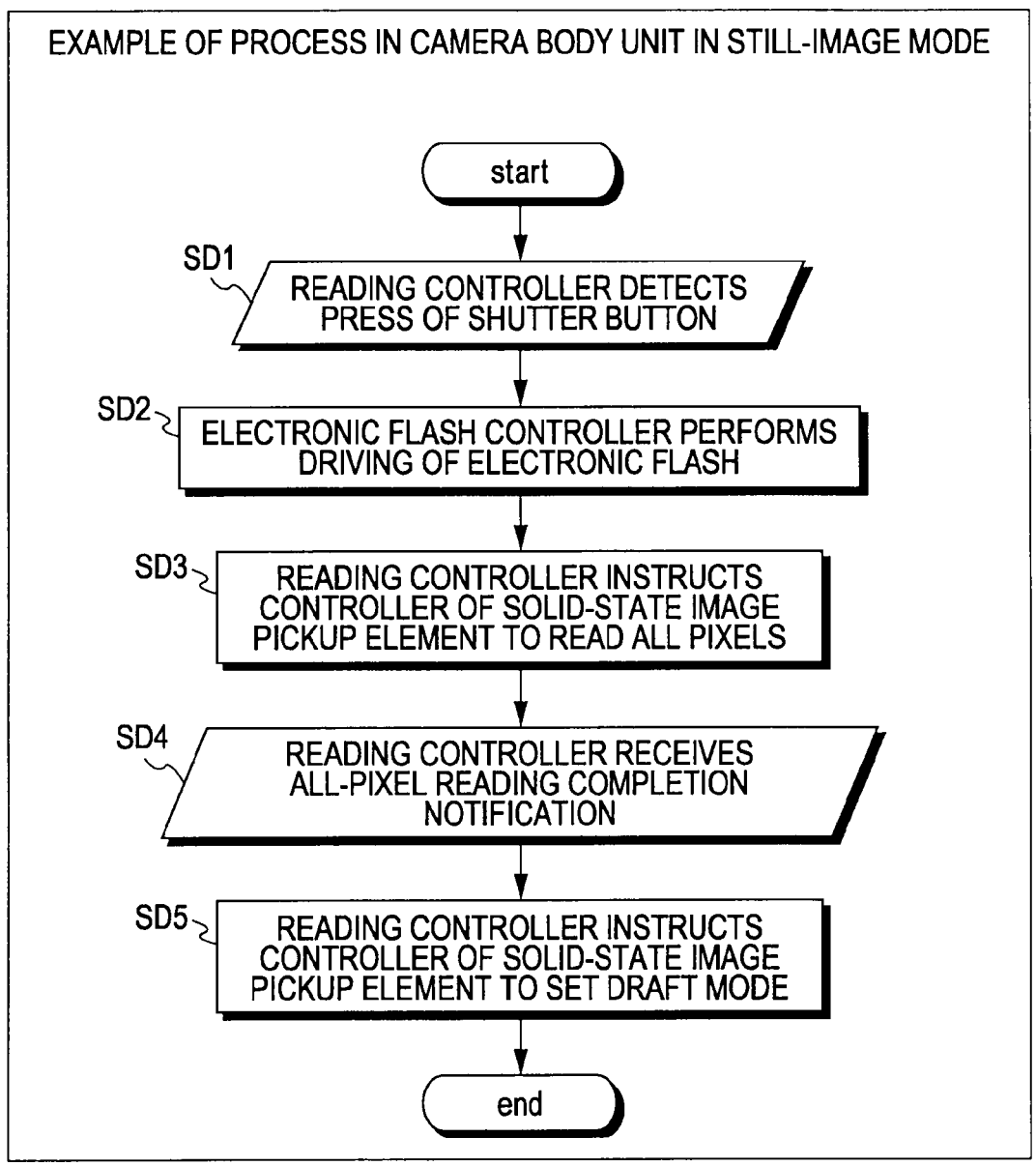
FIG. 13 is a flowchart illustrating an example of a process performed by a camera body unit in the still-image mode.
Figure 14:
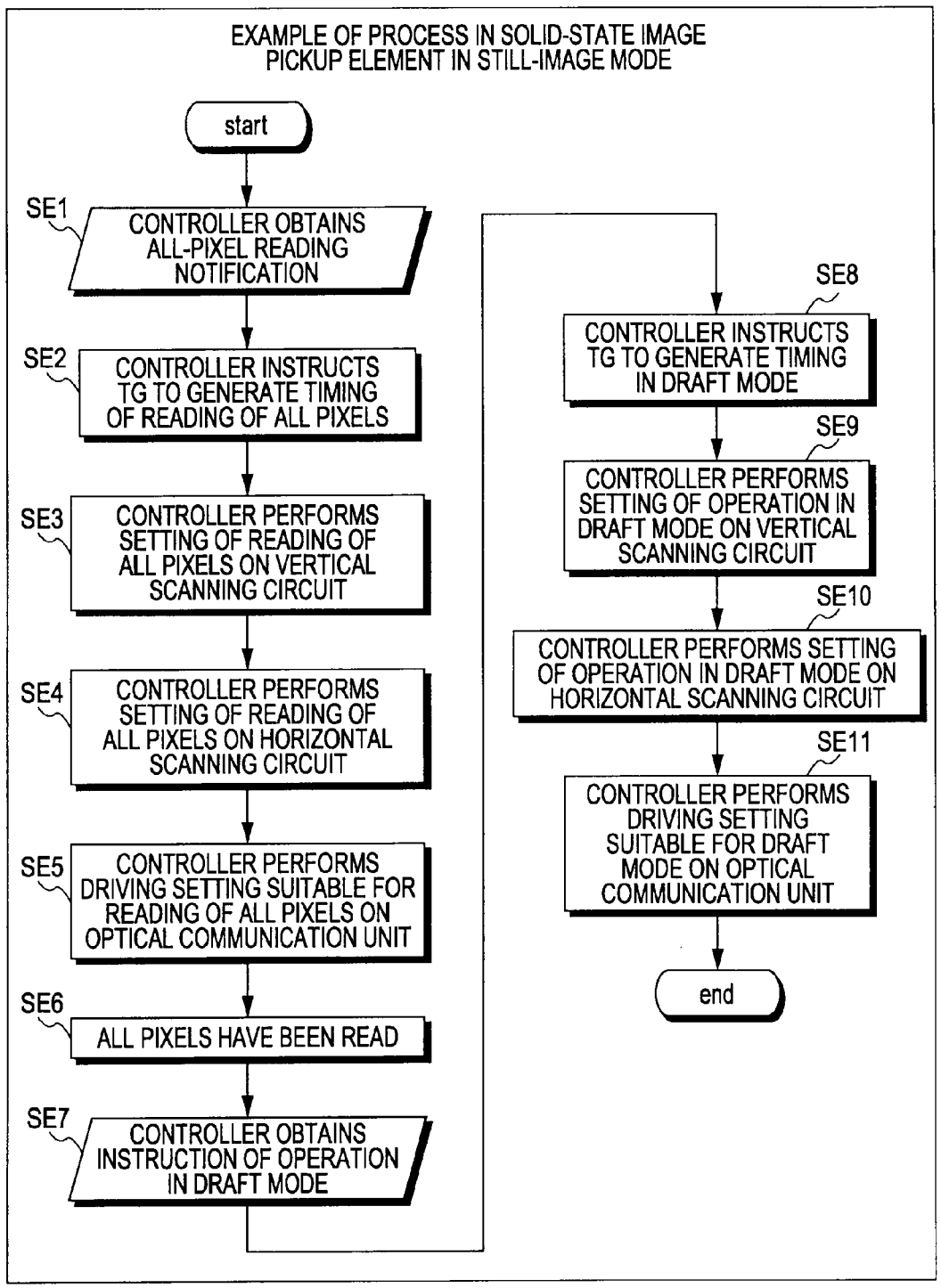
FIG. 14 is a flowchart illustrating an example of a process performed by a solid-state image pickup element in the still-image mode.

FIG. 12 is a diagram illustrating data flow in the still-image mode. FIG. 13 is a flowchart illustrating an example of a process performed by the camera body unit in the still-image mode. FIG. 14 is a flowchart illustrating an example of a process performed by the solid-state image pickup element in the still-image mode. The still-image mode will now be described in detail.

First, the data flow in the still-image mode will be described. The camera system 401A instructs reading of pixel data by selecting all the pixels in a certain order. In the solid-state image pickup element 1A, an image of light entered from the lens unit 20 is subjected to photoelectric conversion by the pixel unit 10A. Signal charges read from the pixels which have been instructed to be read are amplified by the FD amplifier 107, and noise is removed by the column CDS circuit 104. The pixel data read from the pixel unit 10A is subjected to A/D conversion by the A/D convertor 11A and converted into optical signals by the optical communication unit 12A to be output.

The optical signals output from the optical communication unit 12A of the solid-state image pickup element 1A are input to the optical communication unit 30A of the camera body unit 403A, converted into electric signals by the optical communication unit 30A, and stored in the data storage unit 35A. The pixel data for one screen which has been stored in the data storage unit 35A is subjected to a demosaic process and a camera signal process by the signal processor 34A and displayed in the display unit 36A.

Next, a process performed by the camera body unit 403A which executes the still-image mode will be described. In the camera body unit 403A, the reading controller 33A detects a press of the shutter 404 in step SD1 of FIG. 13. Here, in the camera body unit 403A, the AE/AF detector 405 performs photometry and ranging so that setting and control of camera parameters for image pickup are performed while the shutter 404 is pressed halfway. Then, exposure is controlled in accordance with a shutter timing and reading of all the pixels is started.

In the camera body unit 403A, in step SD2 of FIG. 13, the electronic flash controller 407 drives the electronic flash 406 in accordance with a result of the photometry. Note that the process in step SD2 is not performed under a setting in which emission of light from the electronic flash 406 is banned.

In step SD3 of FIG. 13, in the camera body unit 403A, the reading controller 33A executes the still-image mode and instructs the controller 16A of the solid-state image pickup element 1A to read all the pixels. In the camera body unit 403A, the reading controller 33A receives a notification representing completion of the reading of all the pixels from the controller 16A of the solid-state image pickup element 1A in step SD4 of FIG. 13. In the camera body unit 403A, when receiving the notification representing completion of the reading of all the pixels from the solid-state image pickup element 1A, the reading controller 33A instructs the controller 16A of the solid-state image pickup element 1A to execute the draft mode in step SD5 of FIG. 13.

A process performed by the solid-state image pickup element 1A which executes the still-image mode will now be described. In step SE1 of FIG. 14, the solid-state image pickup element 1A receives an instruction for reading all the pixels in the still-image mode in accordance with the process in step SD3 of FIG. 13 which is performed by the reading controller 33A of the camera body unit 403A.

The controller 16A of the solid-state image pickup element 1A instructs the timing generator 13A to generate a timing when all the pixels are read in step SE2 of FIG. 14. The controller 16A performs a setting of reading of all the pixels to the vertical scanning circuit 102 in step SE3 of FIG. 14. Furthermore, the controller 16A performs a setting of reading of all the pixels to the horizontal scanning circuit 103 in step SE4 of FIG. 14.

The controller 16A performs a setting of driving suitable for the reading of all the pixels to the optical communication unit 12A in step SE5 of FIG. 14. By this, in the solid-state image pickup element 1A, pixel data is read from the pixels in a certain order in the pixel unit 10A, and the reading of all the pixels are terminated in step SE6 of FIG. 14.

After the reading of all the pixels are terminated in the solid-state image pickup element 1A, the notification representing completion of the reading of all the pixels is transmitted to the reading controller 33A of the camera body unit 403A in step SD4 of FIG. 13, and the execution of the draft mode is instructed in step SD5 of FIG. 13.

In step SE7 of FIG. 14, the solid-state image pickup element 1A receives the instruction of reading of the pixels in the draft mode in accordance with the process in step SD5 of FIG. 13 which is performed by the reading controller 33A of the camera body unit 403A.

The controller 16A of the solid-state image pickup element 1A instructs the timing generator 13A to generate a timing when the pixels are read in step SE8 of FIG. 14. The controller 16A performs a setting of the draft mode to the vertical scanning circuit 102 in step SE9 of FIG. 14. Furthermore, the controller 16A performs a setting of the draft mode to the horizontal scanning circuit 103 in step SE10 of FIG. 14. Moreover, the controller 16A performs a setting of driving suitable for the draft mode to the optical communication unit 12A in step SE11 of FIG. 14.

Concrete Example of Signals in Operation Modes

Figure 15:
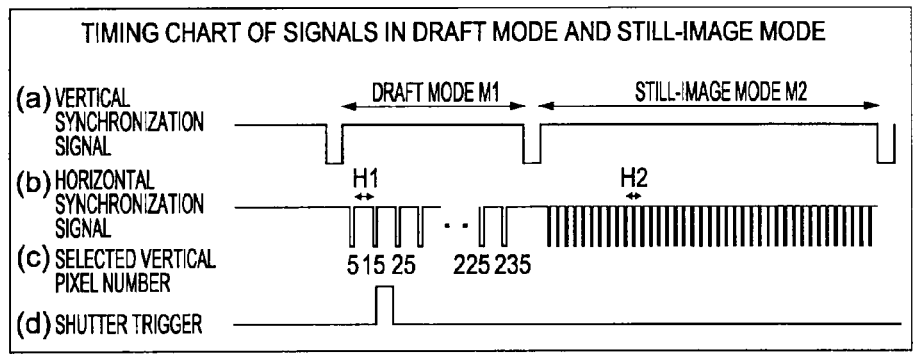
FIG. 15 is a timing chart of signals in the draft mode and the still-image mode.
Figure 16:
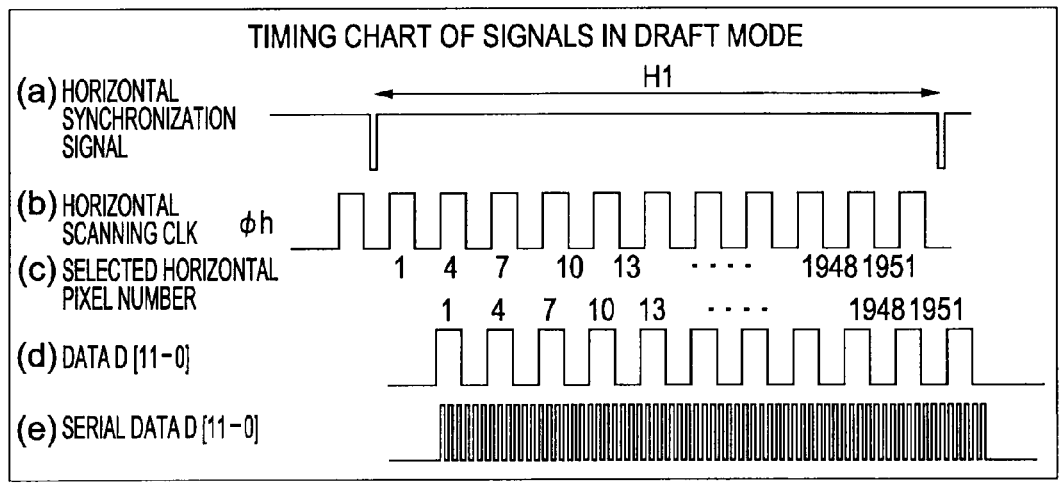
FIG. 16 is a timing chart of signals in the draft mode.
Figure 17:
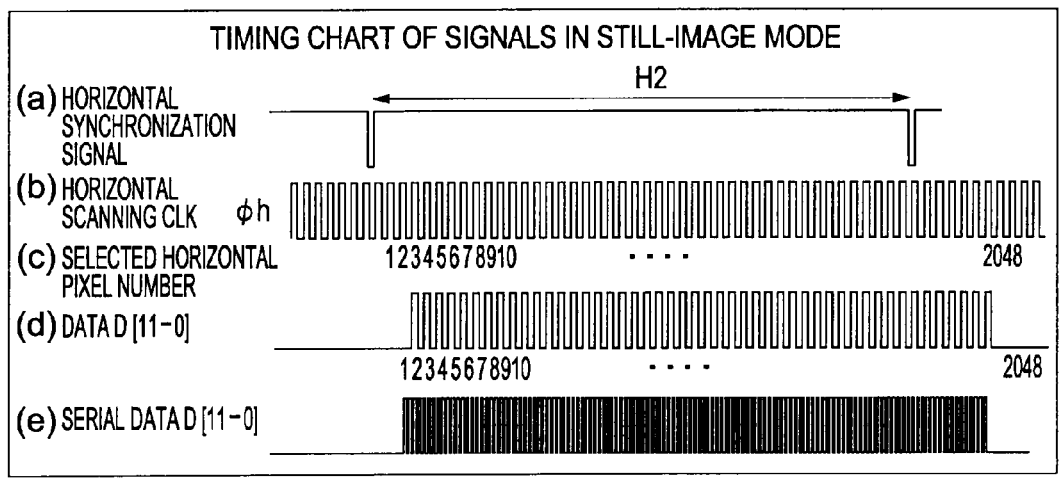
FIG. 17 is a timing chart of signals in the still-image mode.

FIG. 15 is a timing chart of signals in the draft mode and the still-image mode. FIG. 16 is a timing chart of signals in the draft mode. FIG. 17 is a timing chart of signals in the still-image mode.

In the draft mode M1, the controller 16A instructs the timing generator 13A to generate a timing when the draft mode is entered. Then, the timing generator 13A generates a vertical synchronization signal shown in (a) of FIG. 15 and a horizontal synchronization signal shown in (b) of FIG. 15. Furthermore, the controller 16A performs a setting of the draft mode on the vertical scanning circuit 102 and the horizontal scanning circuit 103 so that pixels which have numbers shown in (c) of FIG. 15 and from which signals are to be read are selected.

Then, a shutter trigger shown in (d) of FIG. 15 is input, the photometry and the ranging are performed. After reading for one screen is terminated in the draft mode M1, the still-image mode M2 is executed. In the still-image mode M2, the controller 16A instructs the timing generator 13A to generate a timing when all the pixels are read. Then, the timing generator 13A generates a vertical synchronization signal shown in (a) of FIG. 15 and a horizontal synchronization signal shown in (b) of FIG. 15. Furthermore, the controller 16A performs a setting of reading of all the pixels on the vertical scanning circuit 102 and the horizontal scanning circuit 103.

In the draft mode M1, when a certain horizontal scanning period H1 is focused on, a horizontal scanning clock φh is generated as shown in (b) of FIG. 16 as a driving clock for a horizontal synchronization signal shown in (a) of FIG. 16. Furthermore, pixels having numbers shown in (c) of FIG. 16 are selected so that signals are read. By this, data D shown in (d) of FIG. 16 is read, and serial data shown in (e) of FIG. 16 is obtained.

In the still-image mode M2, when a certain horizontal scanning period H2 is focused on, a horizontal scanning clock φh is generated as shown in (b) of FIG. 17 as a driving clock for a horizontal synchronization signal shown in (a) of FIG. 17. Furthermore, pixels having numbers shown in (c) of FIG. 17 are selected so that signals are read. By this, data D shown in (d) of FIG. 17 is read, and serial data shown in (e) of FIG. 17 is obtained. Note that serialization of data will be described hereinafter.

Example of Method for Ensuring Synchronization Timing of Processes of Reading Pixel Data Next, a method for ensuring a synchronization timing of processes of reading pixel data performed by the optical communication unit and an electric operation unit such as the pixel unit and the A/D convertor will be described.

As shown in FIG. 5, in the solid-state image pickup element 1A, the driving clock generated by the timing generator 13A is supplied to the pixel unit 10A, the A/D convertor 11A, and the optical communication unit 12A in accordance with an operation mode. The pixel unit 10A, the A/D convertor 11A, and the optical communication unit 12A perform signal input/output processes in synchronization with one another in accordance with the driving clock supplied from the timing generator 13A.

Figure 18:
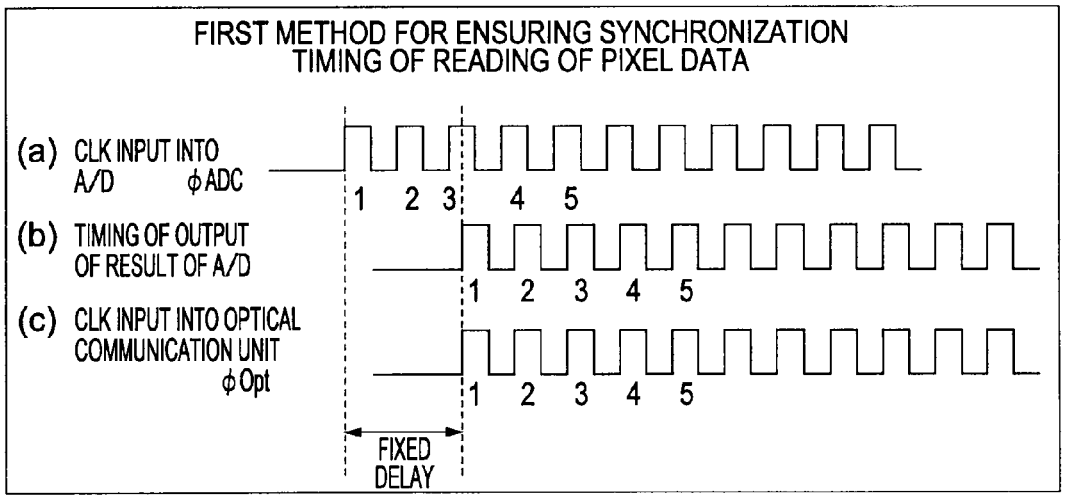
FIG. 18 is a timing chart of an example of a first method for ensuring a synchronization timing of reading of pixel data.

FIG. 18 is a timing chart of an example of a first method for ensuring a synchronization timing of processes of reading pixel data. In the first method for ensuring the synchronization timing, the optical communication unit 12A is driven at a timing when the A/D convertor 11A performs an output process.

A signal output from the A/D convertor 11A is delayed as shown in (b) of FIG. 18 relative to a driving clock φADC which is shown in (a) of FIG. 18 and which is input to the A/D convertor 11A. As for the delay of the process in the A/D convertor 11A, an amount of the delay is fixed because of a circuit configuration. Therefore, as shown in (c) of FIG. 18, a driving clock φOpt a phase of which is shifted on the basis of the fixed delay amount of the A/D convertor 11A is generated by the timing generator 13A to be supplied to the optical communication unit 12A.

Figure 19:
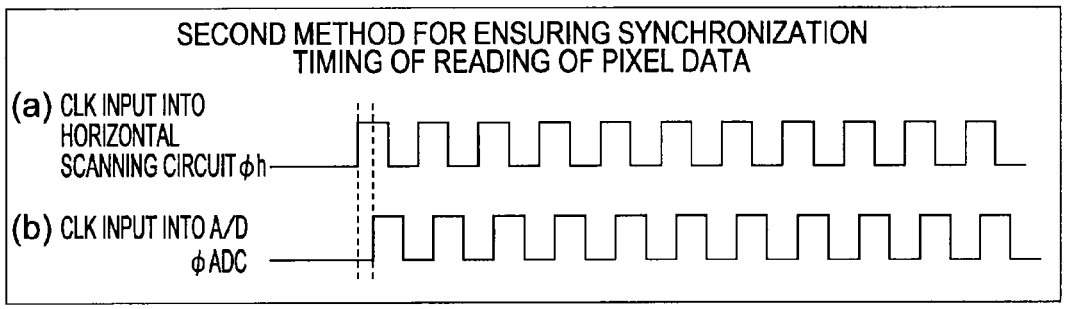
FIG. 19 is a timing chart of an example of a second method for ensuring a synchronization timing of reading of pixel data.

FIG. 19 is a timing chart of an example of a second method for ensuring a synchronization timing of processes of reading pixel data. In the second method for ensuring the synchronization timing, the A/D convertor 11A latches an input signal at a timing when data is output in horizontal scanning performed by the horizontal scanning circuit 103.

A signal output from the horizontal scanning circuit 103 is delayed relative to a driving clock φh which is shown in (a) of FIG. 19 and which is input to the horizontal scanning circuit 103. Therefore, as shown in (b) of FIG. 19, a driving clock φADC which matches a timing when values of columns are output by the horizontal scanning circuit 103 is generated by the timing generator 13A to be supplied to the A/D convertor 11A.

Figure 20:
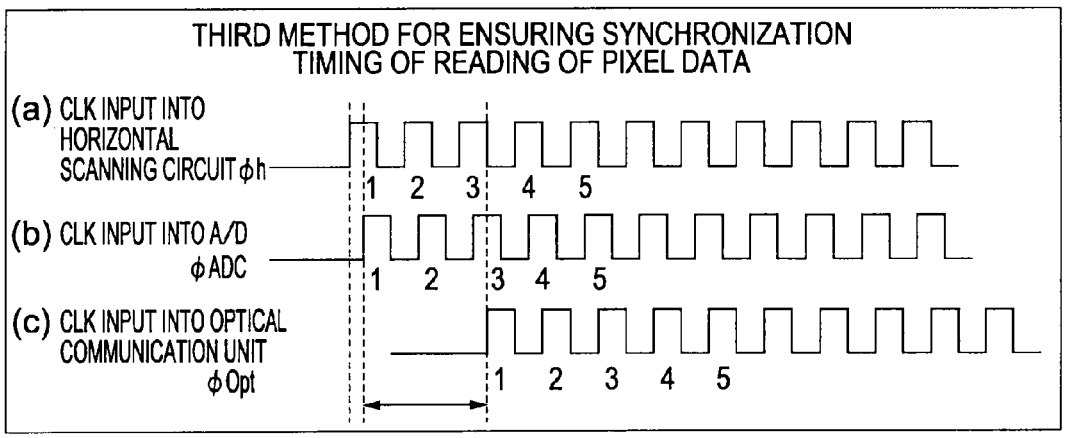
FIG. 20 is a timing chart of an example of a third method for ensuring a synchronization timing of reading of pixel data.

FIG. 20 is a timing chart of an example of a third method for ensuring a synchronization timing of processes of reading pixel data. The third method for ensuring the synchronization timing is obtained by combining and optimizing the first and second methods described above with each other.

A driving clock φADC which matches a timing of output of the horizontal scanning circuit 103 is generated by the timing generator 13A as shown (b) of FIG. 20 relative to a driving clock φh input to the horizontal scanning circuit 103 shown in (a) of FIG. 20, and is supplied to the A/D convertor 11A. Furthermore, as shown in (c) of FIG. 20, a driving clock φOpt a phase of which is shifted in advance on the basis of a fixed delay amount of the A/D convertor 11A relative to the driving clock φADC input to the A/D convertor 11A is generated by the timing generator 13A, and is supplied to the optical communication unit 12A.

In the third method for ensuring the synchronization timing, since the driving clock φOpt to be supplied to the optical communication unit 12A is generated taking the delay in the pixel unit 10A and the delay in the A/D convertor 11A into consideration, a synchronization timing of high-speed modulation in optical communication can be reliably ensured.

Figure 21:
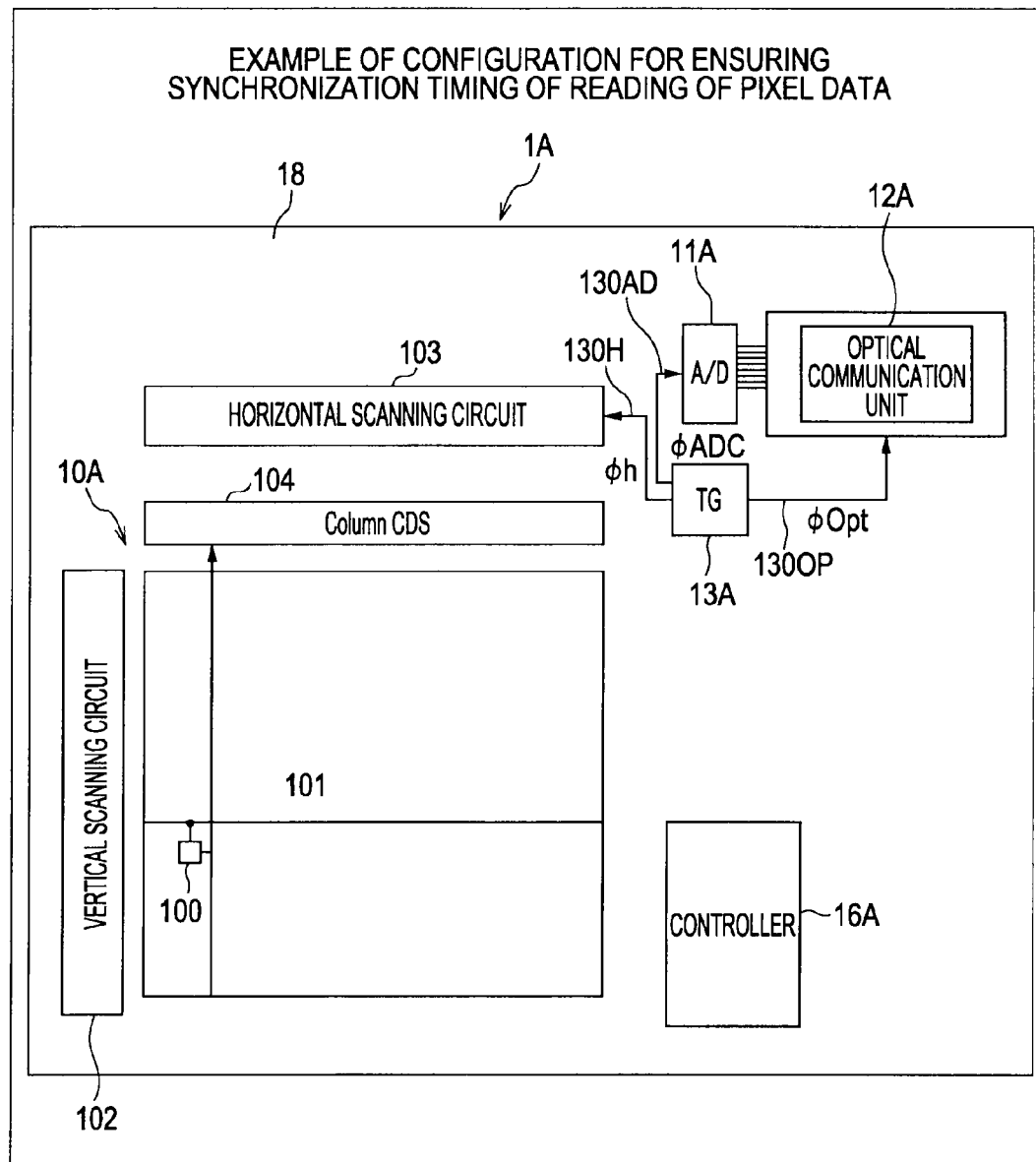
FIG. 21 is a function block diagram illustrating the solid-state image pickup element which shows an example of a configuration in which a synchronization timing of reading of pixel data is ensured.

Example of Configuration for Ensuring Synchronization Timing of Processes of Reading Pixel Data FIG. 21 is a function block diagram of the solid-state image pickup element illustrating an example of a configuration in which a synchronization timing of processes of reading pixel data is ensured. In order to supply the driving clocks generated by the methods described with reference to FIGS. 18 to 20 to the function blocks of the pixel unit 10A, the A/D convertor 11A, and the optical communication unit 12A without delay, lines are configured to have the same lengths.

A line 130H is used to supply the driving clock φh from the timing generator 13A to the horizontal scanning circuit 103. A line 130AD is used to supply the driving clock φADC from the timing generator 13A to the A/D convertor 11A. A line 130OP is used to supply the driving clock Opt from the timing generator 13A to the optical communication unit 12A. The delay of the driving clocks due to a difference between lengths of the lines is prevented by making the lengths of the line 130H, the line 130AD, and the line 130OP the same as one another.

Example of Configuration for Serializing Pixel Data in Optical Communication

Figure 22:
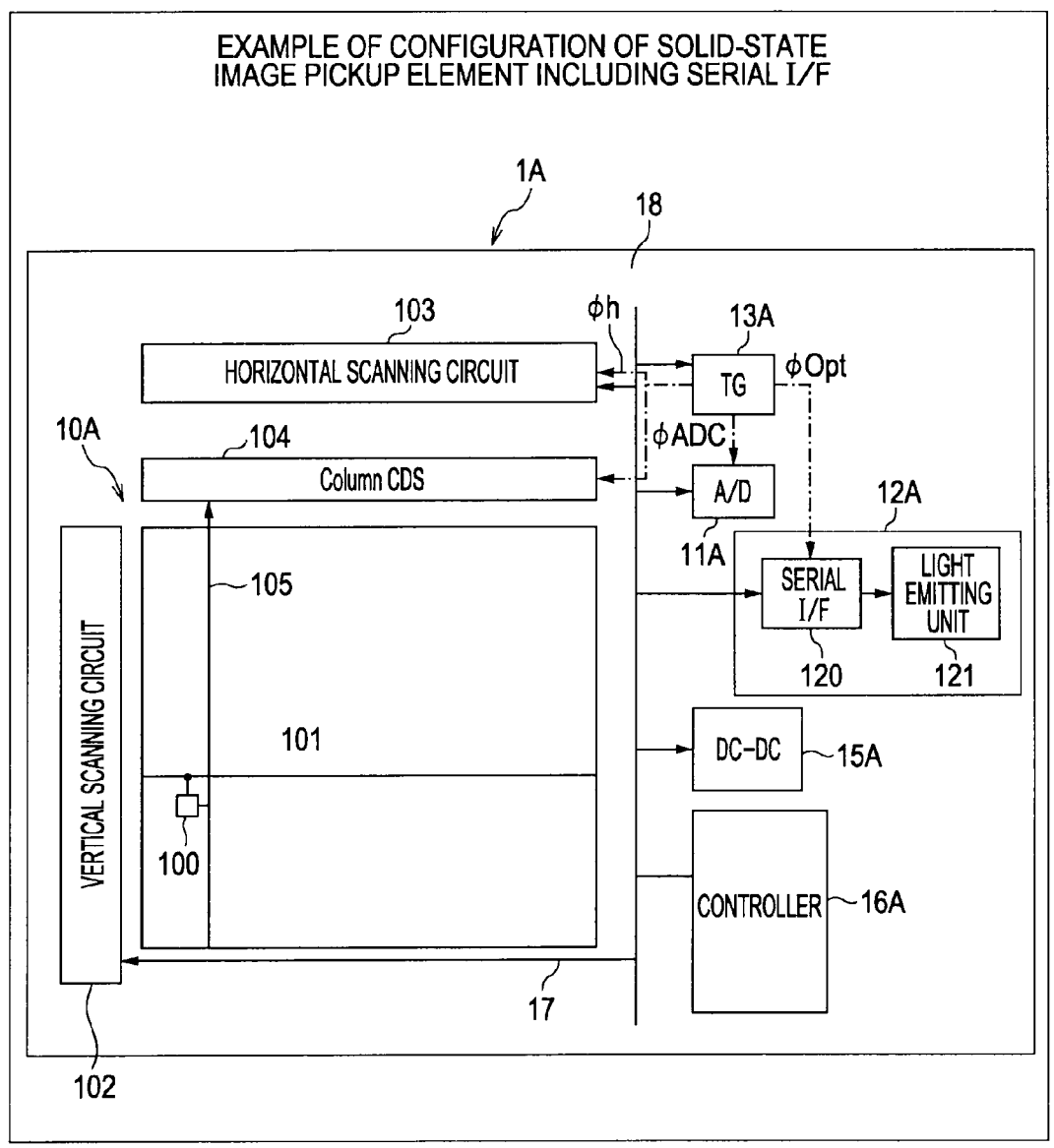
FIG. 22 is a function block diagram illustrating an example of the solid-state image pickup element including a serial interface.
Figure 23:
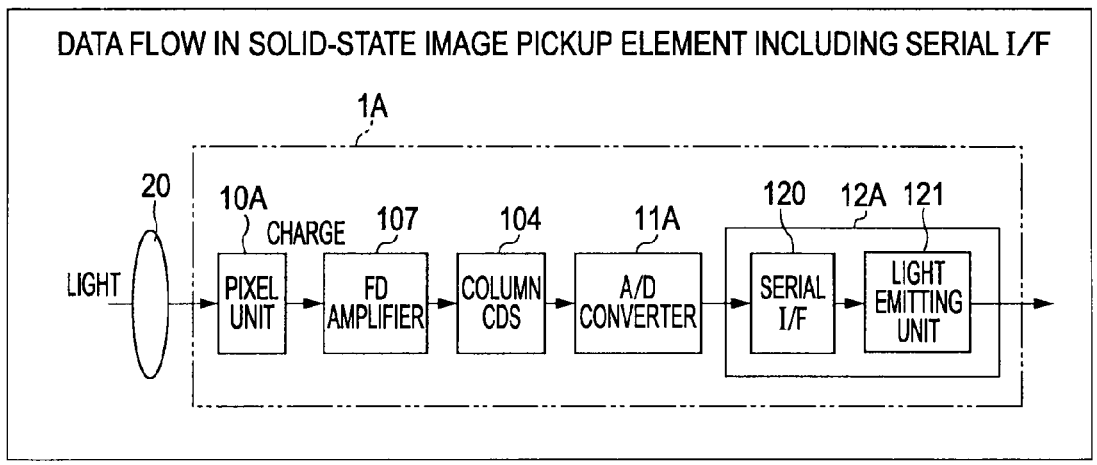
FIG. 23 is a diagram illustrating data flow in the solid-state image pickup element including the serial interface.

FIG. 22 is a function block diagram illustrating an example of the solid-state image pickup element including a serial interface. FIG. 23 is a diagram illustrating data flow in the solid-state image pickup element including the serial interface.

When pixel data is serialized before the pixel data is output in optical communication from the solid-state image pickup element 1A, data having a number of bits may be transmitted using a single transmission channel or using a number of channels less than a number of bits of the data. Therefore, the optical communication unit 12A includes a serial interface (I/F) 120 and a light emitting unit 121.

In the solid-state image pickup element 1A, an image of light entered from the lens unit 20 is subjected to photoelectric conversion by the pixel unit 10A. Signal charges which have been instructed to be read from pixels are amplified by the FD amplifier 107, and noise is removed by the column CDS circuit 104. Pixel data read from the pixel unit 10A is subjected to A/D conversion by the A/D convertor 11A, converted into serial data by the serial interface 120, and converted into optical signals by the light emitting unit 121 to be output.

Figure 24:
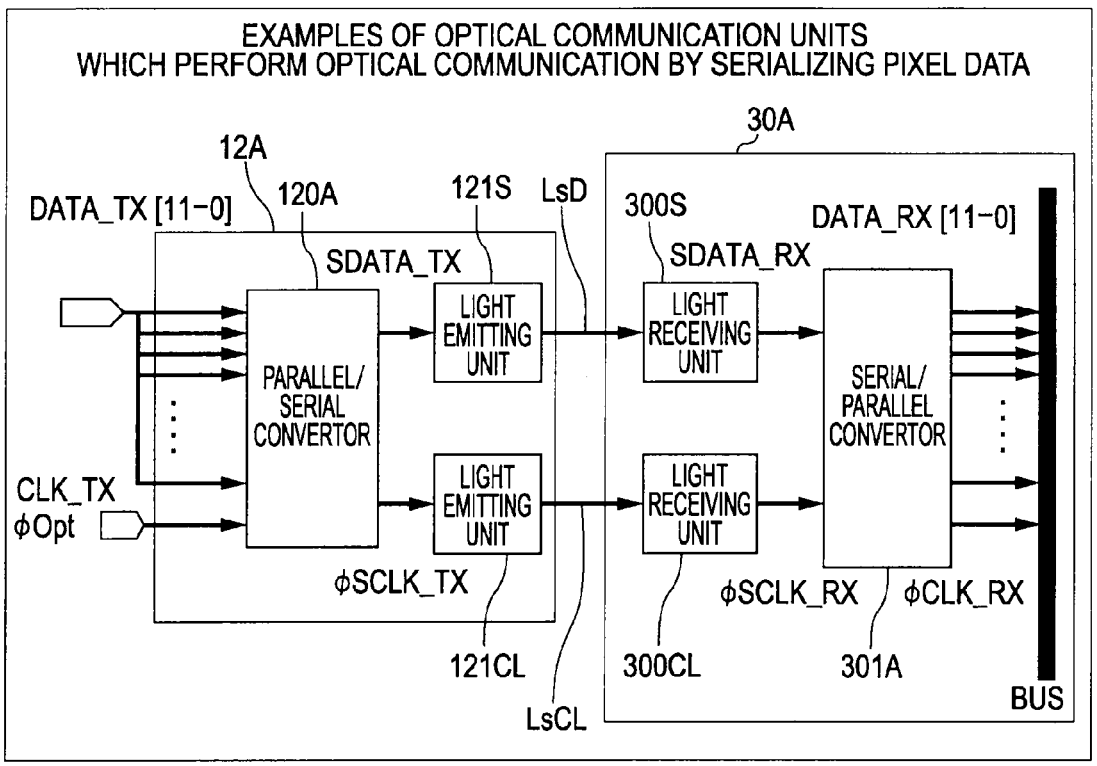
FIG. 24 is a function block diagram illustrating examples of optical communication units included in the solid-state image pickup element and the signal processing apparatus which are used for optical communication performed after pixel data is serialized.
Figure 25:
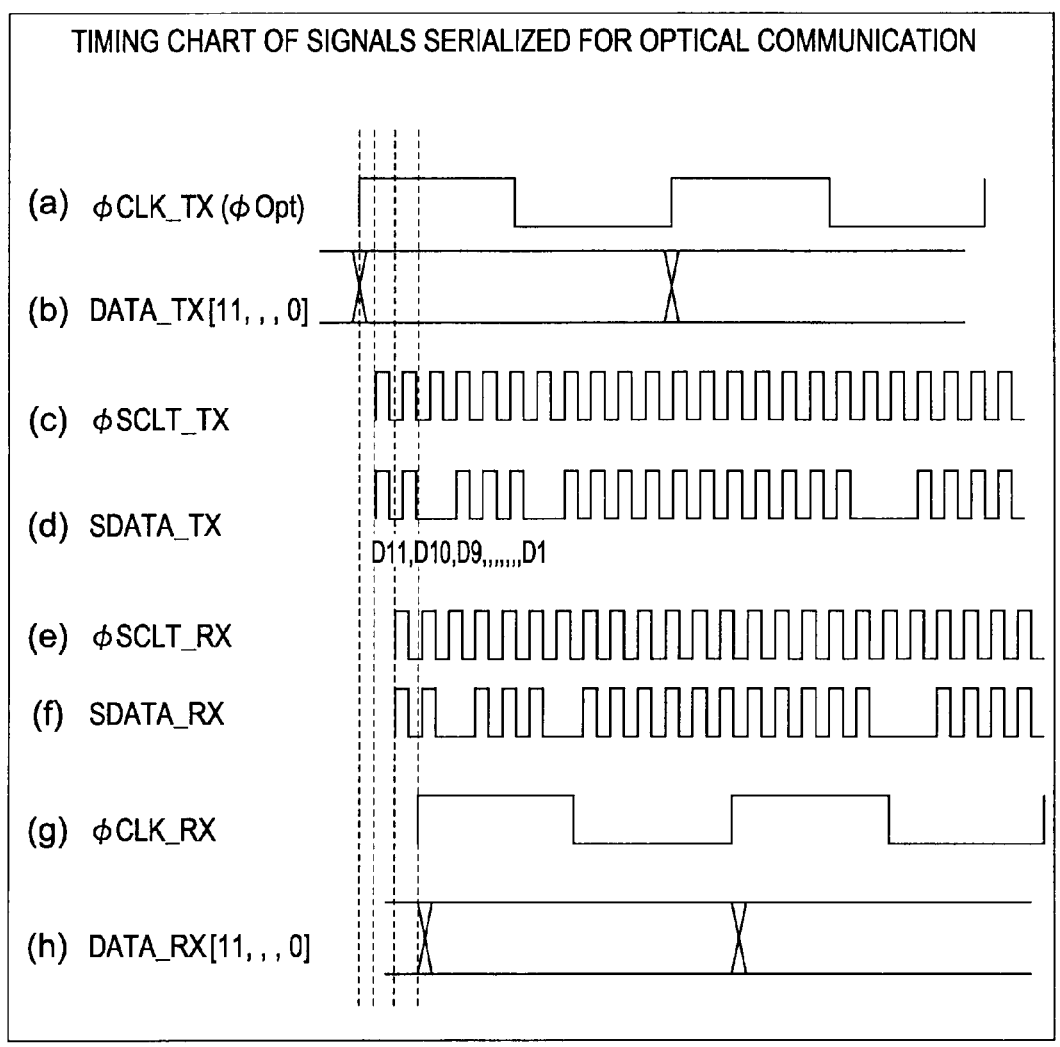
FIG. 25 is a timing chart illustrating an example of signal processing performed using the solid-state image pickup element and the signal processing apparatus in the optical communication after pixel data is serialized.

FIG. 24 is a function block diagram illustrating examples of optical communication units included in the solid-state image pickup element and the signal processing apparatus which are used to optical communication performed by serializing pixel data. FIG. 25 is a timing chart illustrating an example of signal processing performed by the solid-state image pickup element and the signal processing apparatus which perform the optical communication by serializing the pixel data. In the example of FIG. 24, serialized pixel data and a clock signal are transmitted through different transmission channels.

The optical communication unit 12A of the solid-state image pickup element 1A includes a parallel/serial convertor 120A serving as a serial interface which converts pixel data DATA_TX obtained through A/D conversion performed by the A/D convertor 11A into serial data.

Furthermore, the optical communication unit 12A includes a light emitting unit 1215 which converts serialized pixel data SDATA_TX into optical signals to be output, and a light emitting unit 121CL which converts a clock signal φSCLK_TX into an optical signal. The optical communication unit 12A of the solid-state image pickup element 1A and the optical communication unit 30A of the signal processing apparatus 3A or the camera body unit 403A are connected to each other through a data line LsD used to transmit the serialized pixel data by optical communication and a clock line LsCL used to transmit the clock signal by optical communication. The data line LsD and the clock line LsCL are used for space transmission in which an optical fibers and waveguides are not used in this embodiment.

The optical communication unit 30A of the signal processing apparatus 3A and the camera body unit 403A includes an light receiving unit 300S which receives the pixel data SDATA_TX which is obtained through the serializing and which is obtained as optical signals through conversion and which converts the input optical signals into pixel data SDATA_RX serving as serialized electric signals. Furthermore, the optical communication unit 30A includes a light receiving unit 300CL which receives a clock signal φSCLK_TX which is obtained as an optical signal through conversion and which converts the input optical signal into a clock signal φSCLK_RX serving as an electric signal.

Furthermore, the optical communication unit 30A includes a serial/parallel convertor 301A which detects the pixel data DATA_RX from the pixel data SDATA_RX which has been obtained by being converted into electric signals by the light receiving unit 300S using the clock signal φSCLK_RX which has been obtained by being converted into an electric signal by the light receiving unit 300CL.

In the solid-state image pickup element 1A, the pixel data DATA_TX which has been obtained through the A/D conversion by the A/D convertor 11A and the driving clock φOpt corresponding to the clock signal CLK_TX generated by the timing generator 13A are input to the parallel/serial convertor 120A.

The parallel/serial convertor 120A serializes the pixel data DATA_TX shown in (b) of FIG. 25 input from the A/D convertor 11A using the driving clock φOpt shown in (a) of FIG. 25 input from the timing generator 13A. The parallel/serial convertor 120A outputs the clock signal φSCLK_TX shown in (c) of FIG. 25 and the serialized pixel data SDATA_TX shown in (d) of FIG. 25.

The parallel/serial convertor 120A outputs the serialized pixel data SDATA_TX to the light emitting unit 121S and outputs the clock signal φSCLK_TX to the light emitting unit 121CL. The serialized pixel data SDATA_TX is converted into optical signals to be output from the light emitting unit 121S. Furthermore, the clock signal φSCLK_TX is converted into an optical signal to be output from the light emitting unit 121CL.

The optical signals output from the light emitting unit 121S of the solid-state image pickup element 1A are input to the light receiving unit 300S of the signal processing apparatus 3A, and converted into electric signals by the light receiving unit 300S so that the serialized pixel data SDATA_RX is output. The optical signal output from the light emitting unit 121CL of the solid-state image pickup element 1A is input to the light receiving unit 300CL of the signal processing apparatus 3A and converted into an electric signal by the light receiving unit 300CL so that the clock signal φSCLK_RX is output.

In the signal processing apparatus 3A, the clock signal φSCLK_RX shown in (e) of FIG. 25 and the pixel data SDATA_RX shown in (f) of FIG. 25 are input to the serial/parallel convertor 301A.

The serial/parallel convertor 301A detects pixel data from the pixel data SDATA_RX input from the optical reception unit 300S using the clock signal φSCLK_RX input from the optical reception unit 300CL, and outputs the clock signal φCLK_RX and the pixel data DATA_RX shown in (h) of FIG. 25.

Figure 26:
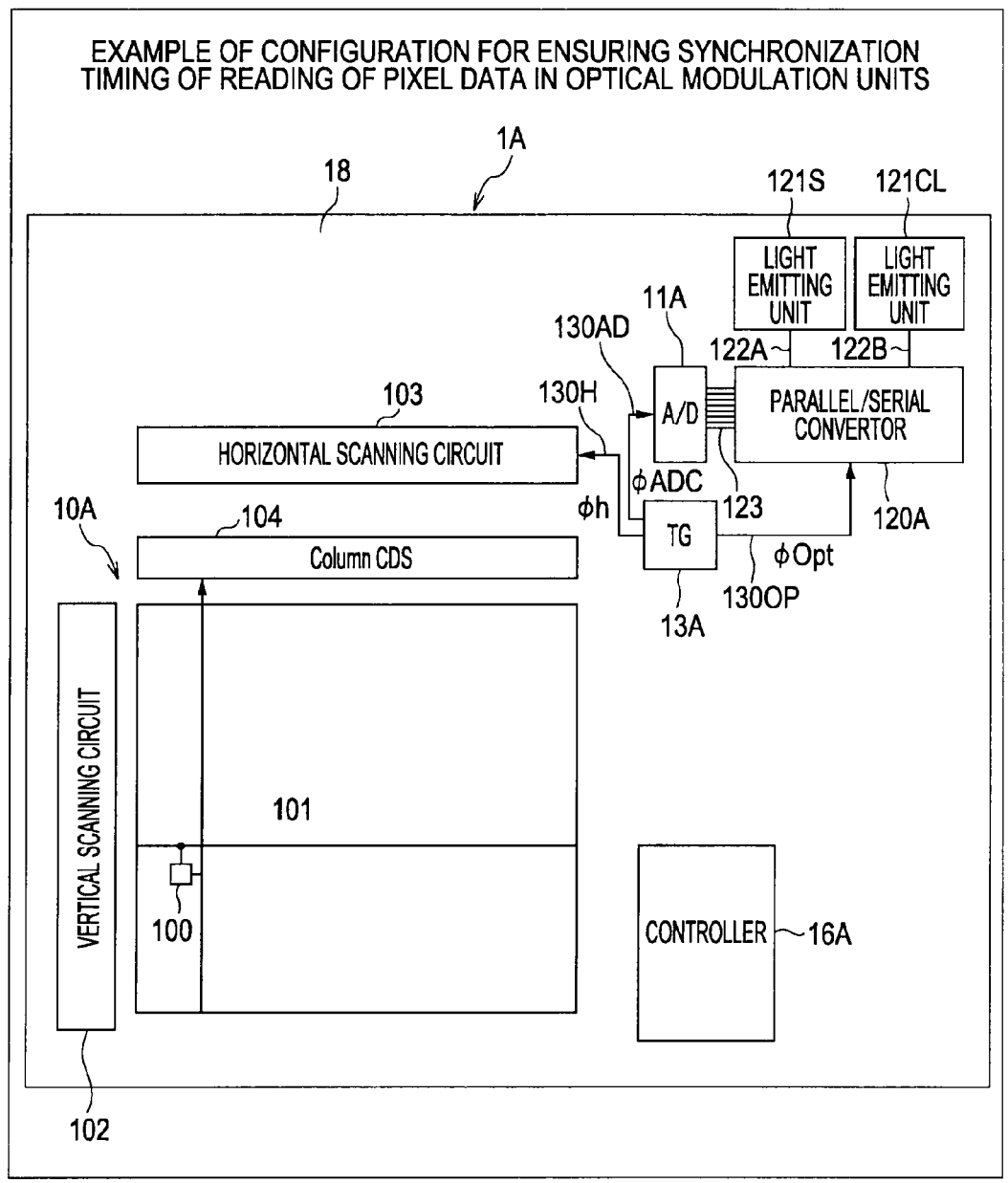
FIG. 26 is a function block diagram illustrating an example of a configuration of the solid-state image pickup element in which a synchronization timing of reading of pixel data using a plurality of light modulation units is ensured.

Example of Configuration for Ensuring Synchronization Timing of Processes of Reading of Pixel Data Performed by Light Modulation Units FIG. 26 is a function block diagram illustrating an example of a configuration of the solid-state image pickup element in which a synchronization timing of reading of pixel data using a plurality of light modulation units is ensured. The line 130H is used to supply the driving clock φh from the timing generator 13A to the horizontal scanning circuit 103. The line 130AD is used to supply the driving clock φADC from the timing generator 13A to the A/D convertor 11A. The line 130OP is used to supply the driving clock φOpt from the timing generator 13A to the parallel/serial convertor 120A of the optical communication unit 12A. The line 130H, the line 130AD, and the line 130OP have line lengths the same as one another whereby delay of the driving clocks caused by a difference among the line lengths is prevented.

Furthermore, a line 122A disposed between the parallel/serial convertor 120A and the light emitting unit 121S and a line 122B disposed between the parallel/serial convertor 120A and the light emitting unit 121CL have line lengths the same as each other. Moreover, lines 123 disposed between the A/D convertor 11A and the parallel/serial convertor 120A have lengths the same as one another.

Figure 27:
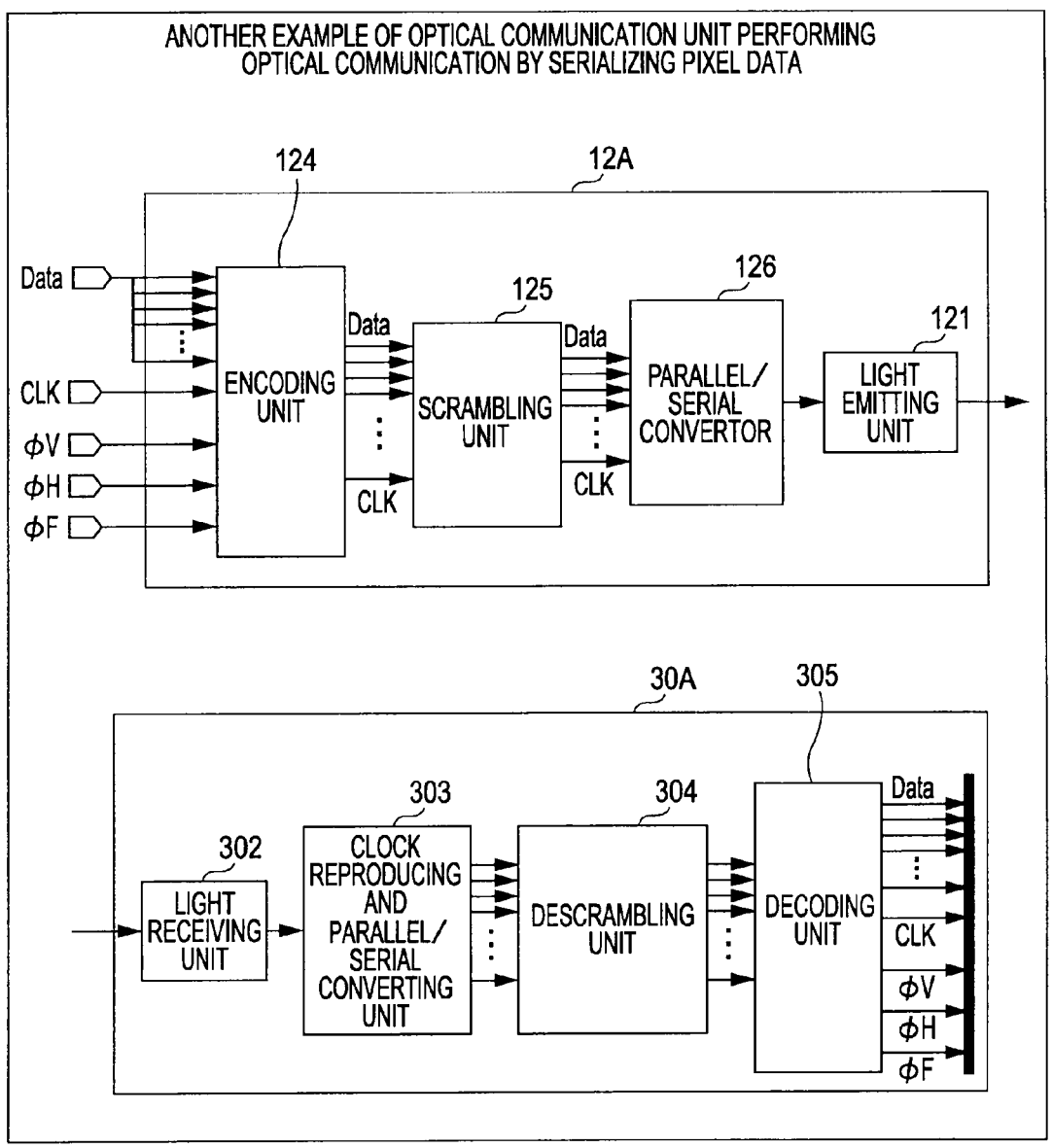
FIG. 27 is a function block diagram illustrating examples of other optical communication units included in the solid-state image pickup element and the signal processing apparatus which are used for optical communication after pixel data is serialized.
Figure 28:
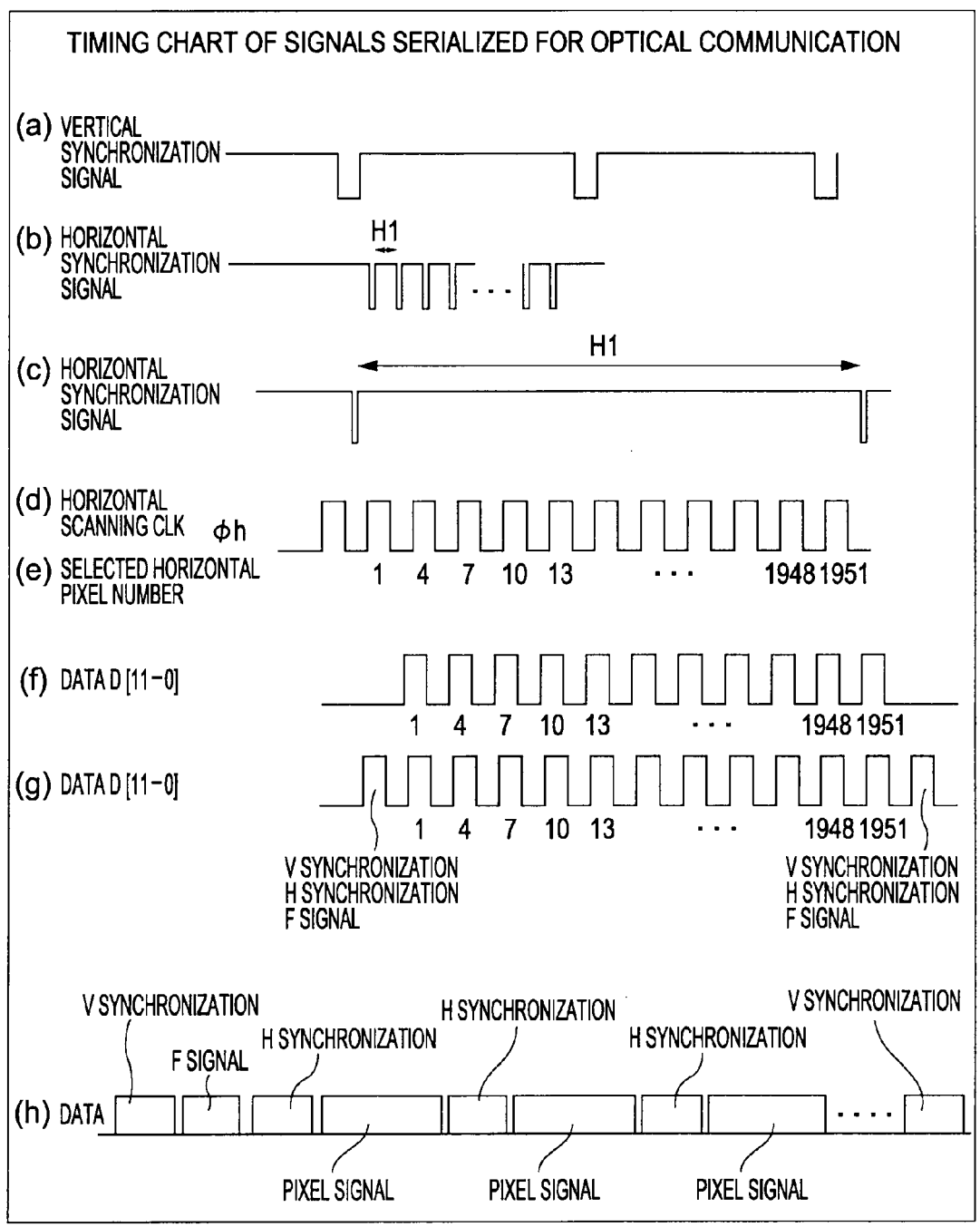
FIG. 28 is a timing chart of serialized signals in the optical communication between the solid-state image pickup element and the signal processing apparatus.

FIG. 27 is a function block diagram illustrating examples of other optical communication units included in the solid-state image pickup element and the signal processing apparatus which are used to perform optical communication by serializing pixel data. FIG. 28 is a timing chart of serialized signals in the optical communication between the solid-state image pickup element and the signal processing apparatus. FIG. 27 shows an example of transmission using a single transmission channel performed after a synchronization signal is superposed on serialized pixel data.

An optical communication unit 12A of the solid-state image pickup element 1A includes an encoding unit 124 which superposes a synchronization signal generated by the timing generator 13A on pixel data obtained through A/D conversion performed by the A/D convertor 11A.

The optical communication unit 12A further includes a data scrambling unit 125 which scrambles the pixel data on which the synchronization signal is superposed and a parallel/serial convertor 126 which converts the pixel data on which the synchronization signal has been superposed and which has been scrambled into serial data. Moreover, the optical communication unit 12A includes a light emitting unit 121 which outputs optical signals obtained by converting the serialized pixel data and the serialized synchronization signal.

An optical communication unit 30A of the signal processing apparatus 3A and the camera body unit 403A includes a light receiving unit 302 which receives the serialized pixel data and the serialized synchronization signal as optical signals and converts the input optical signals into electric signals.

The optical communication unit 30A further includes a serial/parallel convertor 303 which reproduces a clock using the serialized pixel data and the synchronization signal and detects the pixel data. Moreover, the optical communication unit 30A includes a descrambling unit 304 which descrambles the pixel data on which the synchronization signal is superposed and a decoding unit 305 which detects the synchronization signal.

In the solid-state image pickup element 1A, the timing generator 13A generates a vertical synchronization signal φV shown in (a) of FIG. 28. Furthermore, the timing generator 13A generates a horizontal synchronization signal φH shown in (b) of FIG. 28.

When a certain horizontal scanning period H1 is focused on, a horizontal scanning clock φh shown in (d) of FIG. 28 is generated so as to correspond to the horizontal synchronization signal φH. Furthermore, pixels used to read signals are selected as denoted by numbers shown in (e) of FIG. 28. By this, data D shown in (f) of FIG. 28 is read.

In the solid-state image pickup element 1A, the pixel data obtained through the A/D conversion performed by the A/D convertor 11A is input to the encoding unit 124. Furthermore, the vertical synchronization signal φV generated in the timing generator 13A, the horizontal synchronization signal φH generated in the timing generator 13A, and a field signal F used to select a field are input to the encoding unit 124.

In the encoding unit 124, as shown in (g) and (h) of FIG. 28, data representing the field signal F, the vertical synchronization signal φV, and the horizontal synchronization signal φH is included in a period E which does not include pixel data.

Figure 29:
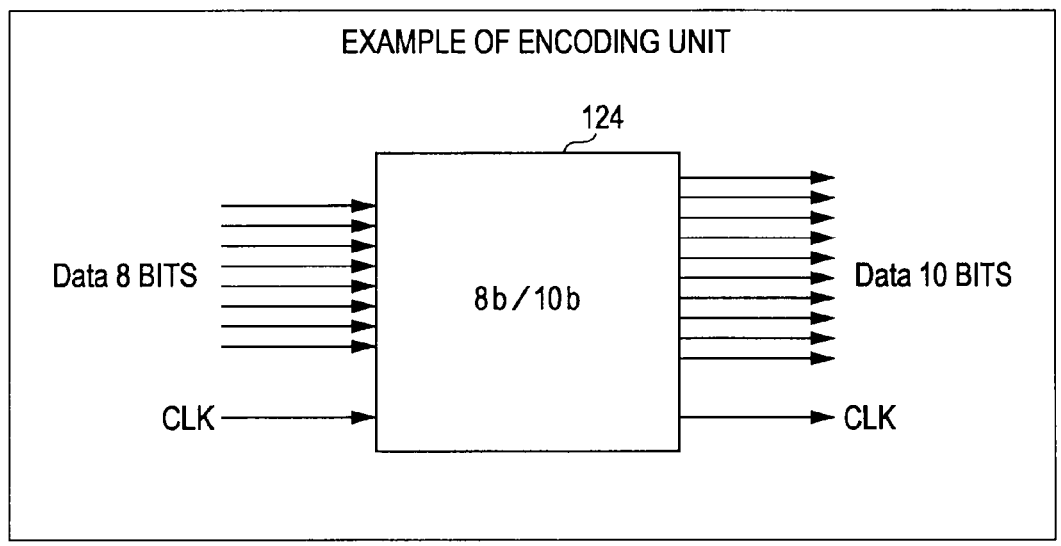
FIG. 29 is a function block diagram illustrating an example of an encoding unit.

FIG. 29 is a function block diagram illustrating an example of the encoding unit. The encoding unit 124 employs an 8b/10b method, for example. In the 8b/10b method, 8-bit data is converted into 10-bit data in accordance with a conversion table, and a clock is superposed on the serial data.

Figure 30:
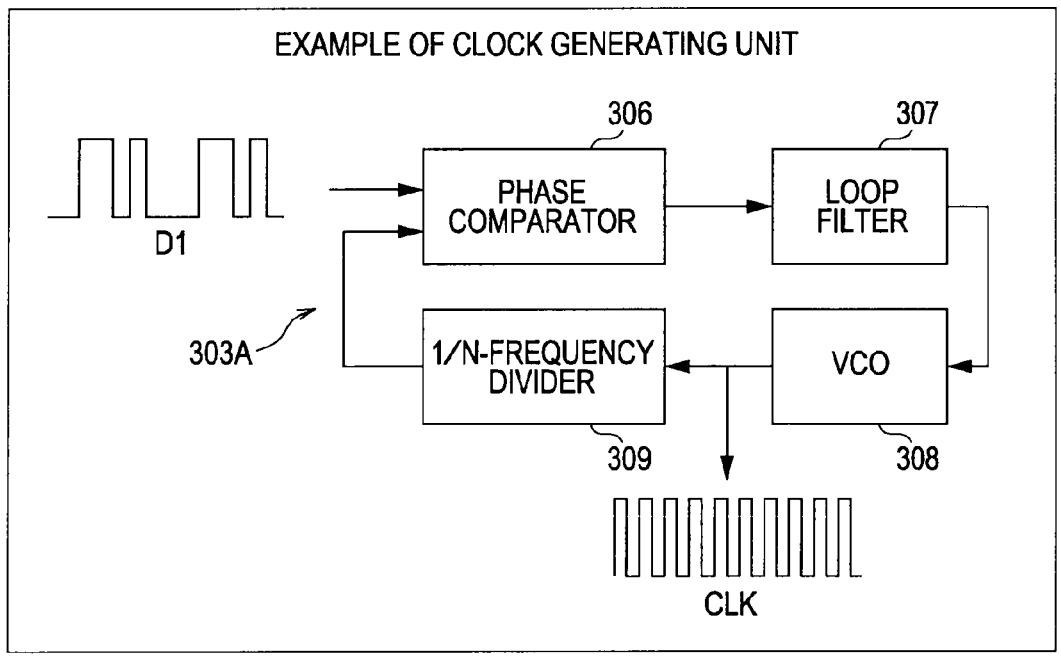
FIG. 30 is a function block diagram illustrating an example of a clock reproducing unit included in a serial/parallel convertor.

FIG. 30 is a function block diagram illustrating an example of a clock reproducing unit included in the serial/parallel conversion unit. A clock reproducing unit 303A includes a phase synchronization circuit (PLL; Phase-locked loop) and reproduces a clock CLK using an edge of input serial data D1.

The clock reproducing unit 303A includes a phase comparator 306 which outputs a voltage obtained by converting a difference between phases of input two signals and a loop filter 307 which performs phase compensation. The clock reproducing unit 303A further includes an oscillator (VCO; voltage controlled oscillator) 308 which controls a frequency of an output pulse using an input voltage and a frequency divider 309 which outputs an frequency after dividing the input frequency by N.

Figure 31:
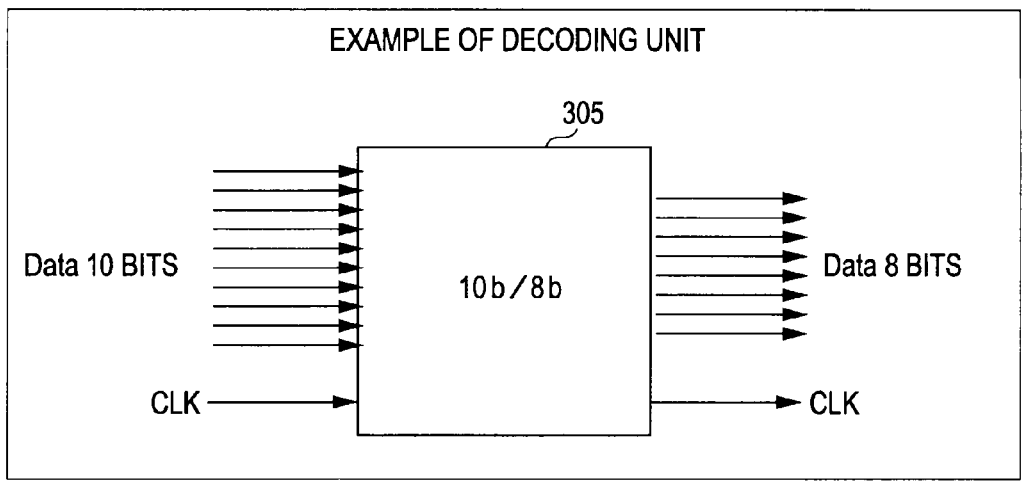
FIG. 31 is a function block diagram illustrating an example of a decoding unit.

FIG. 31 is a function block diagram illustrating an example of the decoding unit. The decoding unit 305 employs a 10b/8b method in response to the encoding unit 124. In the 10b/8b method, the 10-bit data is converted into the original 8-bit data in accordance with a conversion table.

Figure 32:
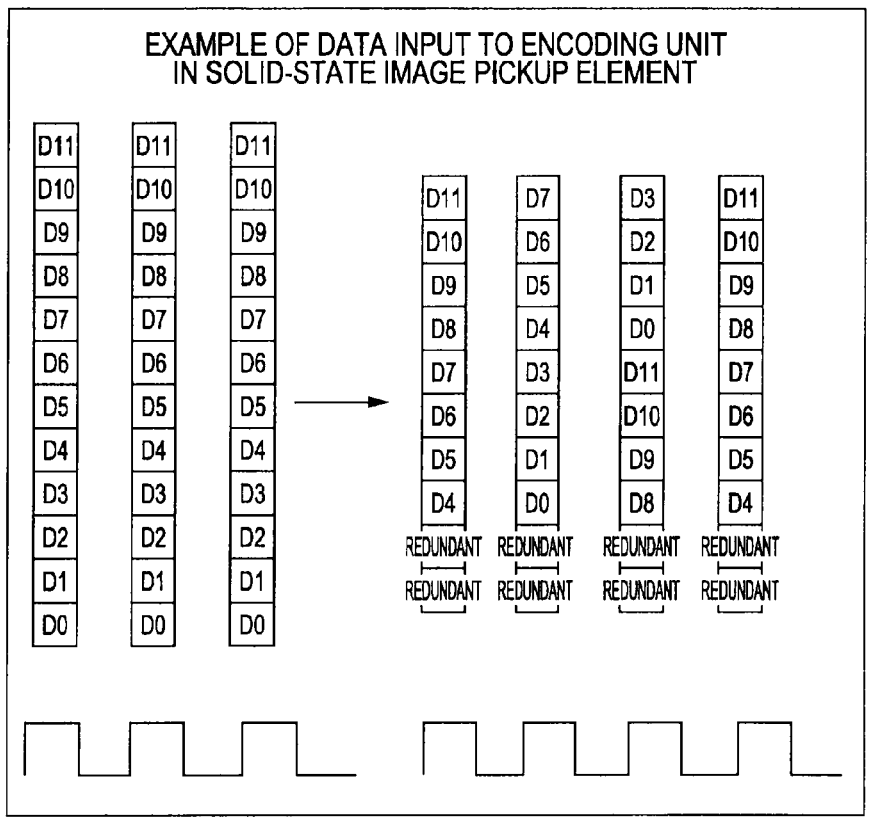
FIG. 32 is a diagram illustrating an example of an operation of generating data to be input into the encoding unit in the solid-state image pickup element.

FIG. 32 is a diagram illustrating an example of an operation of generating data to be input into the encoding unit in the solid-state image pickup element. A method for generating 8-bit data using an output from the A/D convertor 11A when the 8b/10b method is used in the encoding unit 124 will now be described. When data having 8 bits or more is output from the A/D convertor 11A, that is, when data has 12 bits D0 to D11 as shown in the example of FIG. 32, data of 8 bits and data of 4 bits are output.

Figure 33:
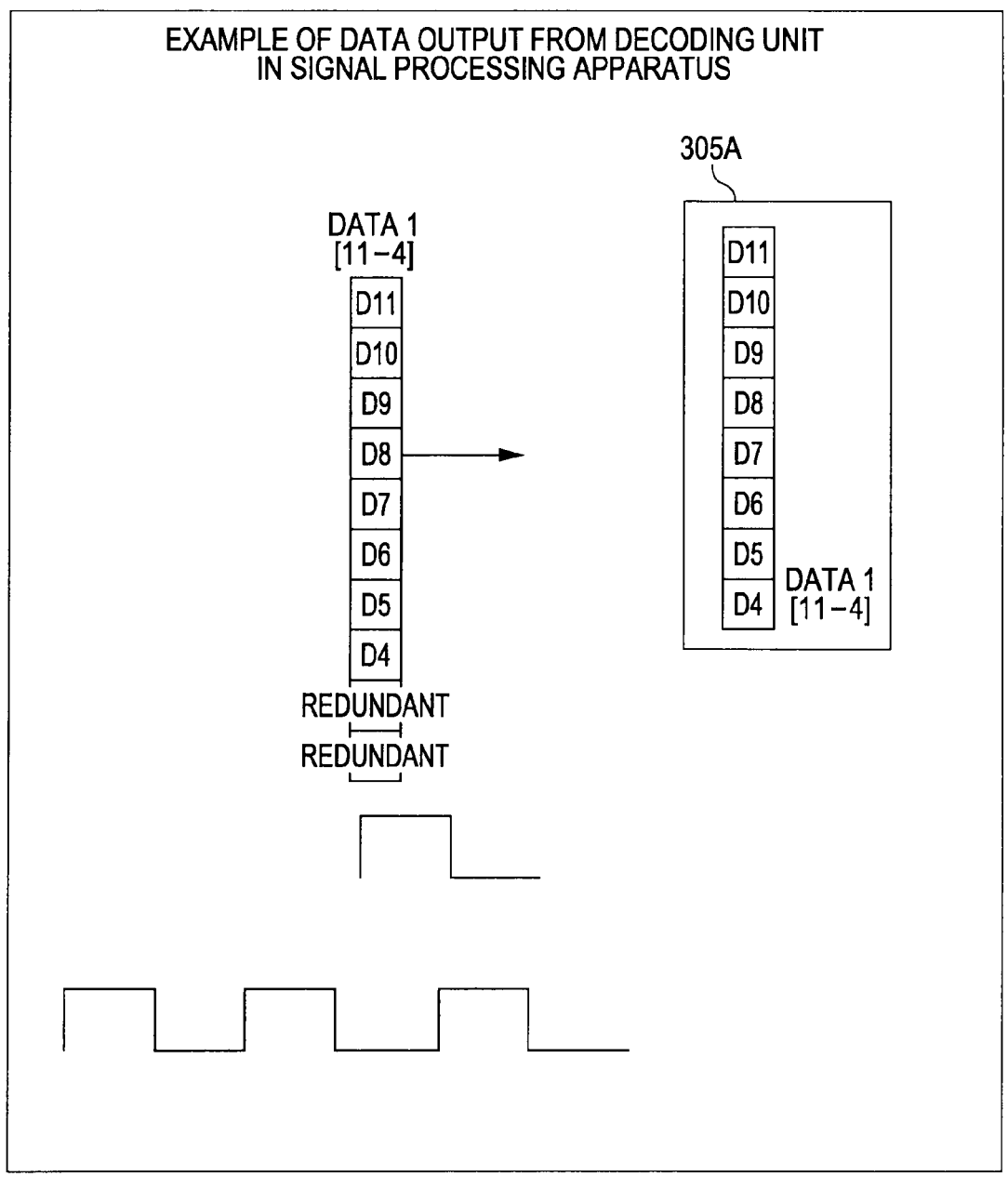
FIG. 33 is a diagram illustrating an example of an operation of generating data to be output from the decoding unit in the signal processing apparatus.
Figure 34:
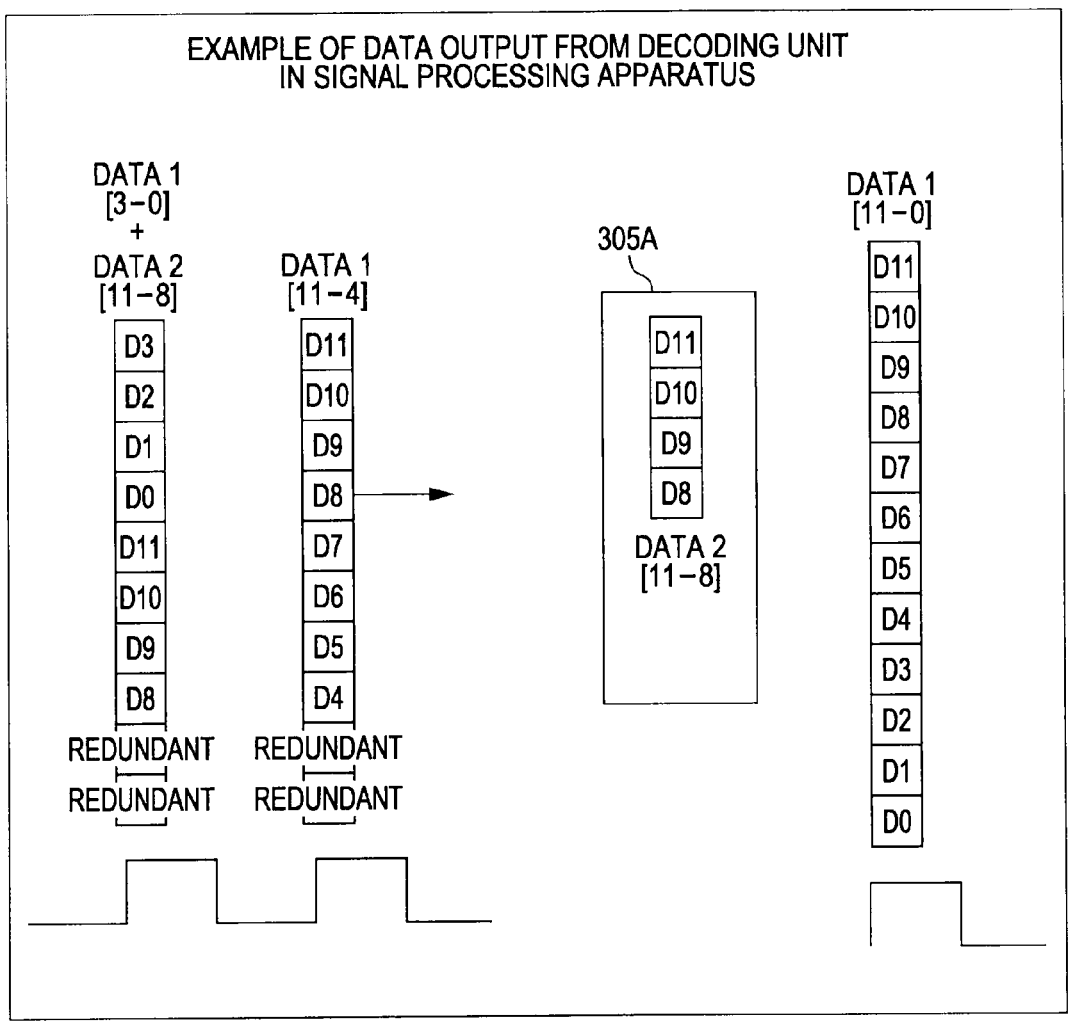
FIG. 34 is a diagram illustrating an example of an operation of generating data to be output from the decoding unit in the signal processing apparatus.
Figure 35:
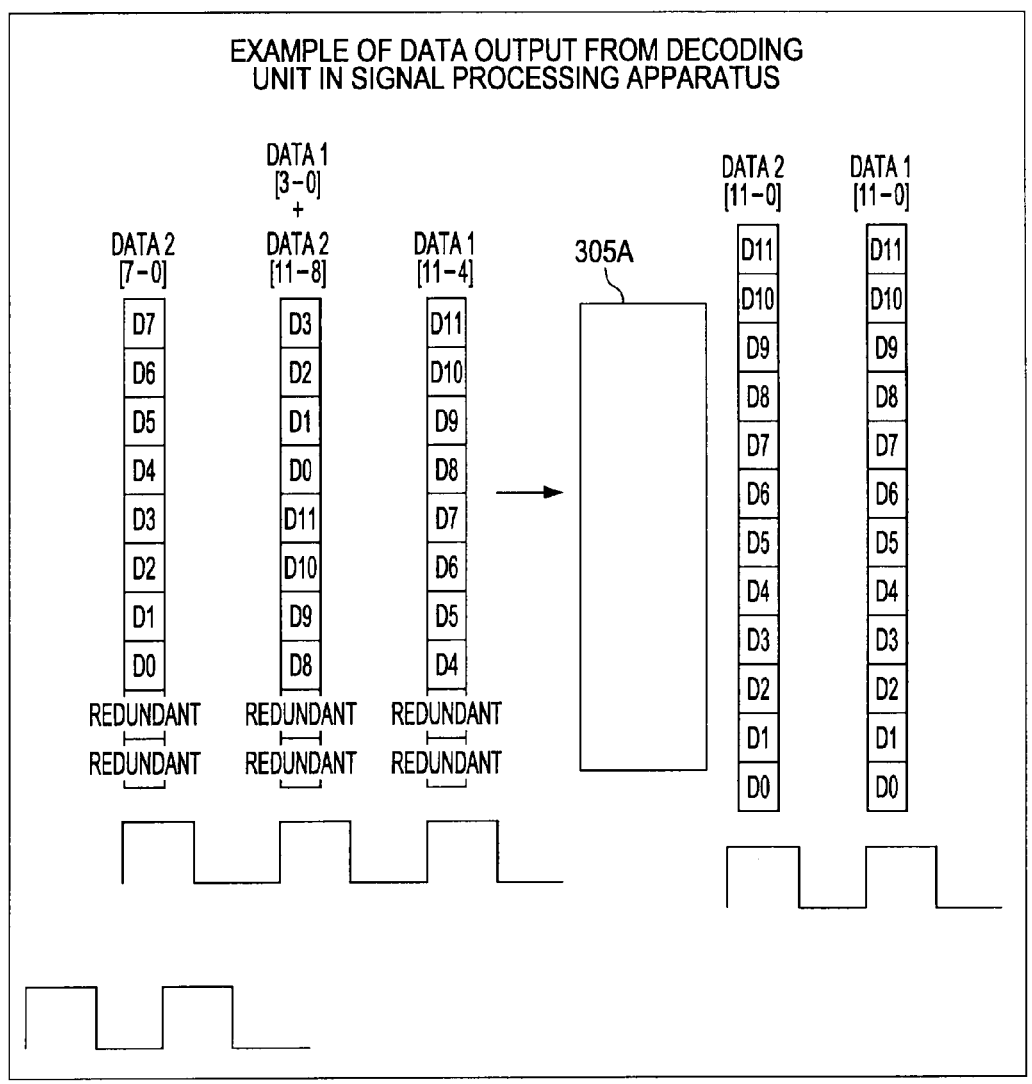
FIG. 35 is a diagram illustrating an example of an operation of generating data to be output from the decoding unit in the signal processing apparatus.

FIGS. 33 to 35 are diagrams illustrating examples of an operation of generating data to be output from the decoding unit in the signal processing apparatus. A method for generating 12-bit data using the decoding unit 305 when the encoding unit 124 employs the 8b/10b method will now be described. For example, original data of 12 bits is transmitted from the solid-state image pickup element after the original data of 12 bits are divided as data blocks of 8 bits. Therefore, the decoding unit 305 should output data as a parallel signal having original 12 bits to the bus. In the examples of FIGS. 33 to 35, when data output from the decoding unit 305 has 8 bits or more, data of 8 bits or data of 4 bits is stored in a buffer 305A, and then, the data is output when data of 12 bits is obtained. In FIG. 33, after reception of data of [11th to 4th] bits in data 1 is terminated, the data is stored in the buffer 305A of the decoding unit 305. In FIG. 34, remaining data of [3rd to 0th] bits in the data 1 is received when the next 8 bits are received, and therefore, the remaining data is combined with the data which has been stored in the buffer 305A with each other so that the data 1 of 12 bits is output. Simultaneously, since data of [11th to 8th] bits in data 2 are received, the four bits are stored in the buffer 305A. In FIG. 35, remaining data of [7th to 0th] bits in the data 2 is received when the further next 8 bits are received, and therefore, the remaining bits are combined with the data which has been stored in the buffer 305A so that the data 2 of 12 bits is output. At this time, the buffer 305A does not include any data.

Concrete Examples of Optical Communication Units

Figure 36:
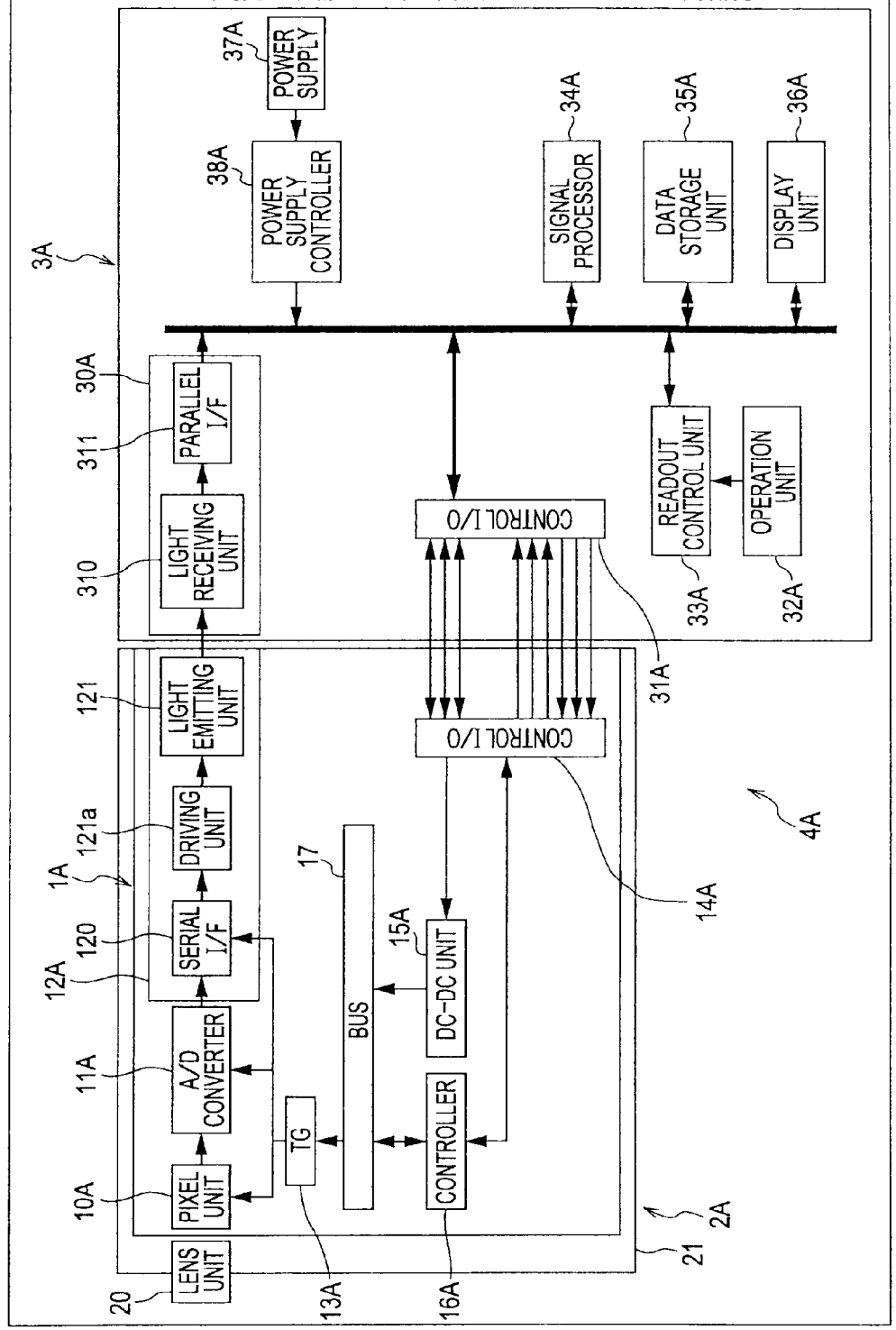
FIG. 36 is a function block diagram illustrating the signal processing system which represents concrete examples of optical communication units.

FIG. 36 is a function block diagram illustrating the signal processing system which represents concrete examples of the optical communication units. The optical communication unit 12A of the solid-state image pickup element 1A includes the serial interface 120, a driving unit 121a, and the light emitting unit 121. The light emitting unit 121 is driven by the driving unit 121a, and outputs signal light which has been modulated using pixel data which has been read from the pixel unit 10A and which has been serialized by the serial interface 120. The optical communication unit 30A of the signal processing apparatus 3A includes a light receiving unit 310 which constitutes a light receiving unit, and a parallel interface 311 which constitutes a parallel/serial convertor.

Figure 37:
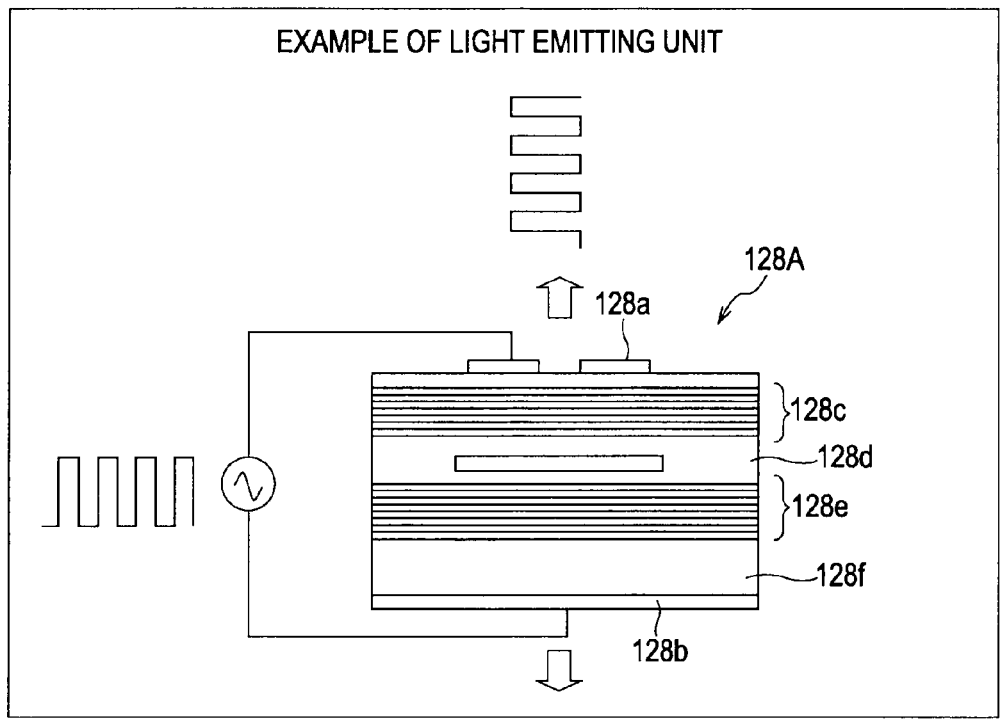
FIG. 37 is a configuration diagram illustrating a light emitting unit.

FIG. 37 is a configuration diagram illustrating the light emitting unit. As the light emitting unit 121, a surface-emitting semiconductor laser (VCSEL) 128A is employed, for example. In the surface-emitting semiconductor laser 128A, an upper black reflection mirror (DBR mirror) 128c, an active layer 128d, a lower black reflection mirror (DBR mirror) 128e, and an n-type semiconductor substrate 128f are laminated between a p-type electrode 128a and an n-type electrode 128b. In the surface-emitting semiconductor laser 128A, since the upper black reflection mirror 128c and the lower black reflection mirror 128e each of which is formed of a dielectric multiple layer are formed with the active layer 128d interposed therebetween, a resonator is formed between the mirrors.

Next, principle of operation of the surface-emitting semiconductor laser 128A will be described.

(1) Voltage is applied to the p-type electrode 128a and the n-type electrode 128b so that current is externally supplied. By this, an inverted distribution state is generated in an energy level of the active layer 128d.

(2) In the active layer 128d, photons having energy corresponding to an energy gap are spontaneously emitted and the photons cause induced emission whereby light is amplified.

(3) The light is reflected by the mirrors disposed on the upper and lower sides of the active layer 128d, and part of the light is guided into the active layer 128d again so as to be amplified by the induced emission.

(4) Part of the amplified light is emitted to the outside through an end surface near the p-type electrode 128a.

In this way, light is turned on or off by associating digital signals representing 1 and 0 output from the A/D convertor 11A with an on-state and an off-state of voltage, respectively, so that modulation is realized. Note that as the light emitting unit 121, an edge-emitting semiconductor laser may be employed.

When the light emitting unit 121 constituted by the semiconductor laser receives excessive current, fusion and breakdown occurs in a portion in the vicinity of the mirrors. Furthermore, in the driving unit 121a which sucks current for driving the semiconductor laser, for example, if only the semiconductor laser is turned on first and current is unintentionally supplied thereto, breakdown may occur. Therefore, the process of controlling on or off of the power is performed as shown in the flowcharts of FIGS. 3 and 4.

Figure 38:
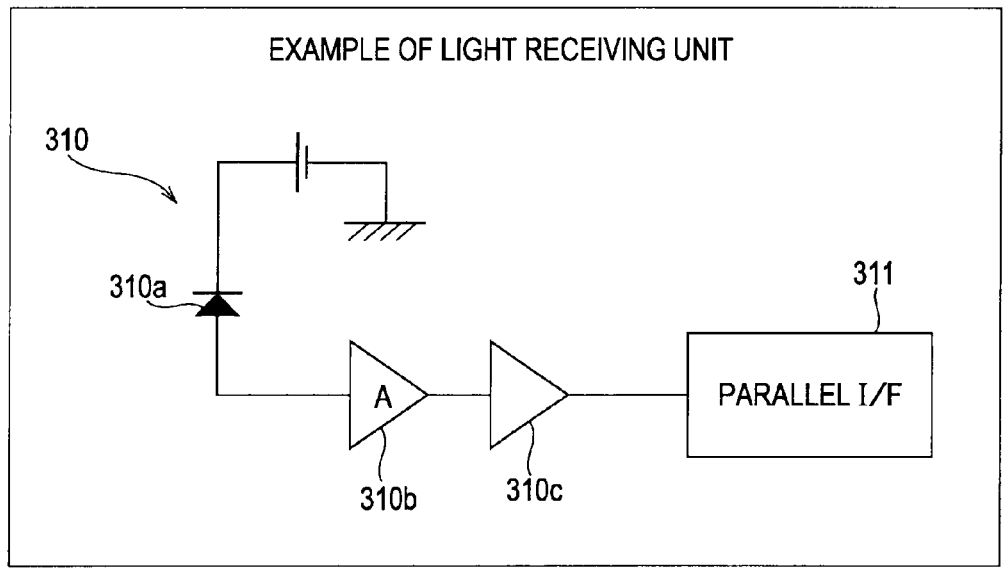
FIG. 38 is a function block diagram illustrating an example of a light receiving unit.

FIG. 38 is a function block diagram illustrating an example of the light receiving unit. The light receiving unit 310 includes a photodiode 310a, a transimpedance amplifier 310b, and a limiting amplifier 310c. The photodiode 310a receives a voltage (inversed bias voltage) applied thereto, and outputs a current in accordance with incident light. The transimpedance amplifier 310b amplifies a weak current signal input from the photodiode 310a and converts the current signal into a voltage signal. The limiting amplifier 310c amplifies the weak signal output from the transimpedance amplifier 310b so as to obtain a signal having certain voltage amplitude irrespective of a magnitude of the signal and outputs the signal.

In general, the transimpedance amplifier 310b disposed immediately after the photodiode 310a operates at high speed and with high sensitivity, and therefore, a protection circuit is not disposed in an input stage. On the other hand, the limiting amplifier 310c has countermeasure for static electricity since the limiting amplifier 310c is used for a voltage input.

Accordingly, when light having an unexpected intensity is input to the photodiode, the amplifier may be broken down. Furthermore, if a voltage higher than a presumed level is applied, the photodiode may be broken down. Therefore, the process of controlling on and off of power is performed in accordance with the process described with reference to the flowcharts of FIGS. 3 and 4.

In the processes of FIGS. 3 and 4, when the power is to be turned on, the signal processing apparatus 3A and the solid-state image pickup element 1A are turned on in this order. Furthermore, in the signal processing apparatus 3A, a control system such as the reading controller 33A is turned on before the optical communication unit 30A is turned on. Moreover, the controller 16A is turned on before the optical communication unit 12A is turned on. In the optical communication unit 12A, the driving unit 121a is turned on before the light emitting unit 121 is turned on. Thereafter, the function blocks including the pixel unit 10A which relate to the image pickup operation are turned on.

In the processes of FIGS. 3 and 4, when the power is to be turned off, the solid-state image pickup element 1A and the signal processing apparatus 3A are turned off in this order. Furthermore, in the signal processing apparatus 3A, the optical communication unit 30A is turned off before the reading controller 33A is turned off. Moreover, in the solid-state image pickup element 1A, the function blocks including the pixel unit 10A which relate to the image pickup operation are turned off before the optical communication unit 12A is turned off. In the optical communication unit 12A, the light emitting unit 121 is turned off before the driving unit 121a is turned off. Then, the optical communication unit 12A is turned off before the controller 16A, for example, is turned off.

Accordingly, in the signal processing apparatus 3A, electric power is supplied to the optical communication unit 30A only in a state in which the optical communication unit 30A is controllable. Furthermore, the optical communication unit 12A on the light emitting side is driven only in a state in which the optical communication unit 30A is available for reception of light. Moreover, in the solid-state image pickup element 1A, electric power is supplied to the light emitting unit 121 only in a state in which the optical communication unit 12A is controllable.

Accordingly, in the optical communication unit 12A of the solid-state image pickup element 1A, breakdown caused by unintentional current supplied when only the semiconductor laser is turned on first may be prevented. Furthermore, in the optical communication unit 30A of the signal processing apparatus 3A, the amplifier is prevented from being broken down due to light having an unexpected intensity input into the photodiode. Moreover, the photodiode is prevented from being broken down due to an input voltage having a level higher than a presumed level.

Example of Effect of Solid-State Image Pickup Element Including Optical Communication Unit Having Light Emitting Unit In the solid-state image pickup element including the optical communication unit having the light emitting unit, a system for outputting light externally input is not required, and positioning among the light emitting unit and the light receiving unit is easily performed. Furthermore, since the solid-state image pickup element is integrated as a single chip, a simple configuration in which the driving circuit and the light emitting unit are integrated is realized. By this, low cost, low power consumption, and reduction of noise are realized. Furthermore, light emitting units may be arranged as an array with ease.

Furthermore, a light source suitable for capability of the solid-state image pickup element 1A may be selected. Moreover, since the solid-state image pickup element 1A includes the light emitting unit, deterioration of signals in transmission paths and generation of noise due to electromagnetic waves may be prevented, and in addition, high-speed transmission of signals is realized.

Furthermore, a high degree of freedom of selection of a light receiving unit on a signal processing apparatus side to which optical signals are input is realized. For example, a light receiving element which operates at high speed in accordance with a reading speed, a light receiving element which operates in accordance with a modulated light amount, and an amplifier may be selected, and accordingly, an optimum configuration is realized with ease. Moreover, arrangement of the light receiving unit and the solid-state image pickup element 1A may be freely set. For example, light output from a light emitting unit of a solid-state image pickup element which is installed in a remote location may be read using a light receiving unit which is installed in another remote location. Furthermore, another light receiving unit which is installed in still another remote location may be used for the reading. Accordingly, the arrangement is freely determined.

Application Examples of Signal Processing System

Figure 39:
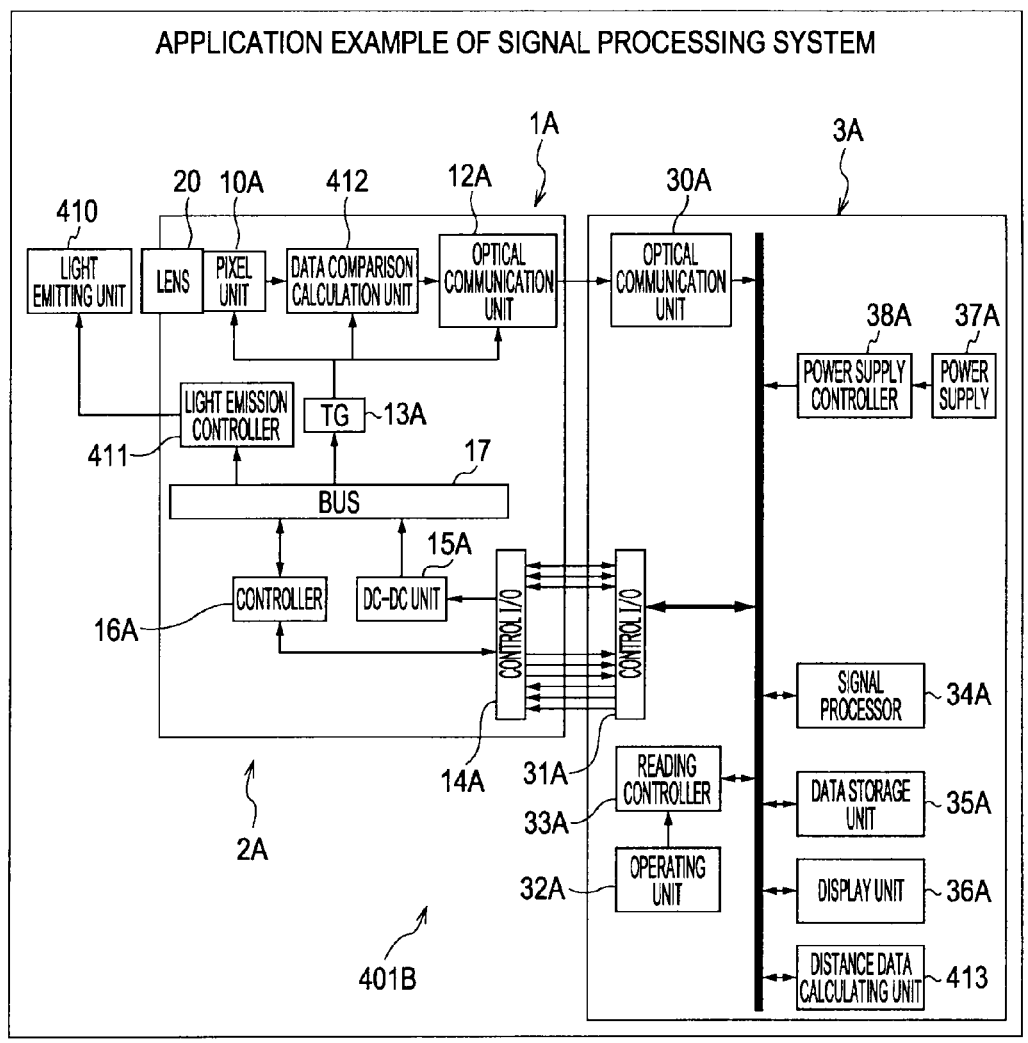
FIG. 39 is a function block diagram illustrating an application example of the signal processing system according to the first embodiment.
Figure 40:
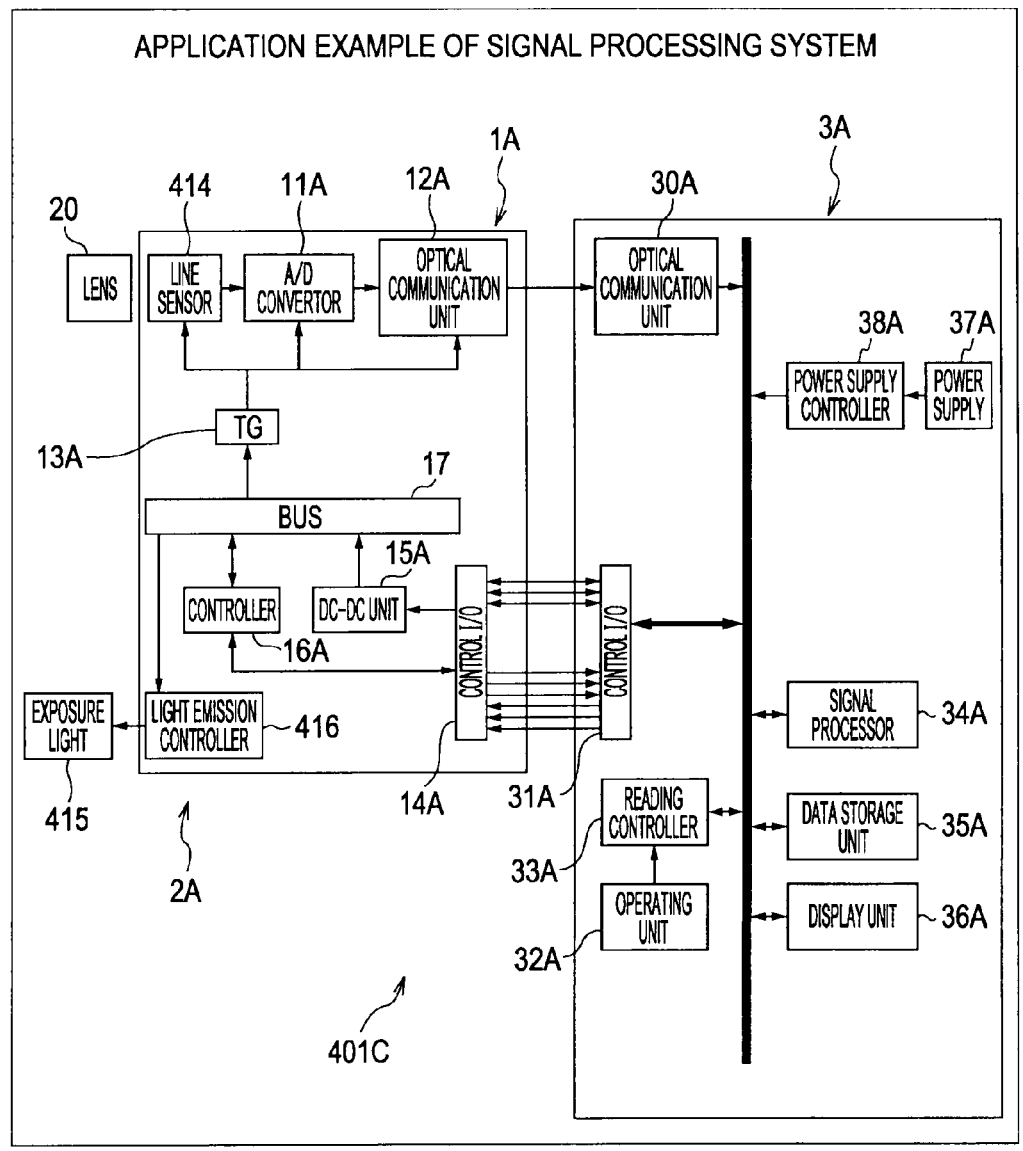
FIG. 40 is a function block diagram illustrating an application example of the signal processing system according to the first embodiment.
Figure 41:
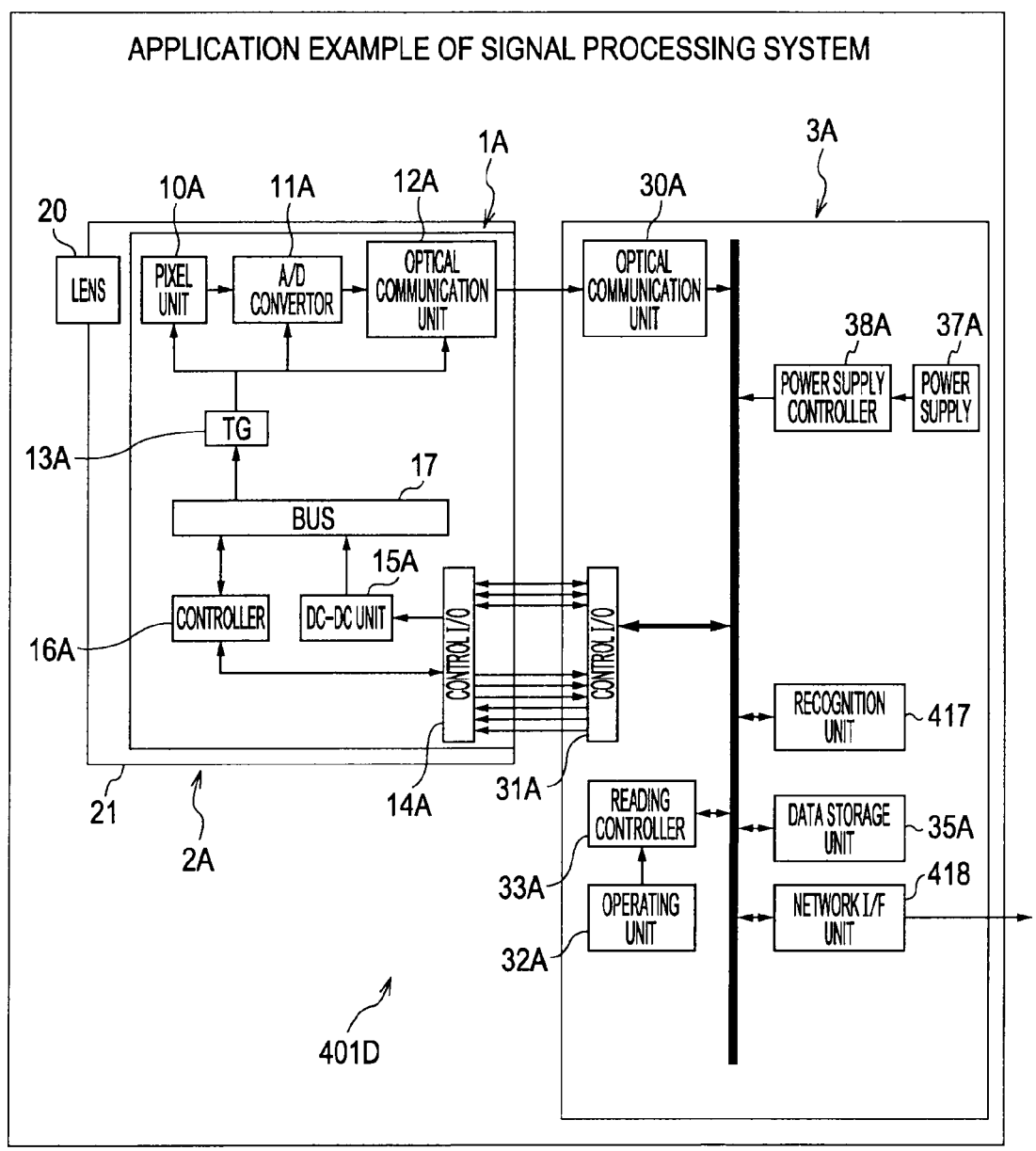
FIG. 41 is a function block diagram illustrating an application example of the signal processing system according to the first embodiment.

FIGS. 39 to 41 are function block diagrams illustrating application examples of the signal processing system according to the first embodiment. In FIG. 39, a ranging apparatus 401B is configured as the signal processing system. In the ranging apparatus 401B, an optical apparatus 2A includes a light emitting unit 410 which irradiates a ranging object, a light emission controller 411, and a data comparison calculation unit 412. Furthermore, a signal processing apparatus 3A includes a distance data calculating unit 413.

In the ranging apparatus 401B, reflection light obtained by reflecting light which is emitted by light emitting unit 410 and with which the ranging object is irradiated enters a pixel unit 10A, the data comparison calculation unit 412 obtains a change of a phase in accordance with a change of a distance using an electric signal read from the pixel unit 10A. A result of calculation performed by the data comparison calculation unit 412 is transmitted from the solid-state image pickup element 1A to the signal processing apparatus 3A through optical communication, and the distance data calculating unit 413 obtains a distance.

In FIG. 40, an image forming apparatus 401C is configured as the signal processing system. Examples of the image forming apparatus 401C include a photocopier, a scanner, a facsimile apparatus, or a complex machine having functions of a photocopier, a scanner, and a facsimile apparatus, or further a network complex machine connected to a network.

The image forming apparatus 401C includes an optical apparatus 2A having a line sensor 414 serving as a pixel unit. The line sensor 414 includes pixels arranged in a matrix. Furthermore, an exposure light device 415 which exposes a photoconductive drum, not shown, and a light emission controller 416 are included.

In FIG. 41, a monitoring camera 401D is configured as the signal processing system. The monitoring camera 401D includes a signal processing apparatus 3A having a recognition unit 417 which recognizes an image supplied from a solid-state image pickup element 1A and a network I/F unit 418 which transmits information to the outside.

Industrial Applicability

The present invention is applied to an optical apparatus including a solid-state image pickup element.

Explanation of Reference Numerals 1A solid-state image pickup element, 10A pixel unit, 11A A/D convertor, 12A optical communication unit, 13A timing generator, 14A control I/O, 15A DC-DC unit, 16A controller, 17 bus, 2A optical apparatus, 20A lens unit, 21 housing, 3A signal processing apparatus, 30A optical communication unit, 31A control I/O, 32A operating unit, 33A reading controller, 34A signal processor, 35A data storage unit, 36A display unit, 37A power supply, 38A power supply controller, 4A signal processing system, 100 pixel, 101 pixel array, 102 vertical scanning circuit, 103 horizontal scanning circuit, 104 column CDS circuit, 105 column signal line, 106 photodiode, 107 FD amplifier, 108 row selection transistor, 109 row selection line, 110 electric charge detector, 111 resetting transistor, 112 amplifying transistor, 113 resetting line, 114 row reading line, 120 serial interface, 120A parallel/serial convertor, 121 121S 121CL light emitting unit, 122A 122B line, 123 line, 124 encoding unit, 125 data scrambling unit, 126 parallel/serial convertor, 128A surface-emitting semiconductor laser, 130H 130AD 1300P line, 300S 300CL light receiving unit, 301A serial/parallel convertor, 302 light receiving unit, 303 serial/parallel convertor, 304 descrambling unit, 305 decoding unit, 306 light receiving unit, 307 parallel interface, 401A camera system, 402A lens unit, 403A camera body unit, 404 shutter, 405 AE/AF detector, 406 electronic flash, 407 electronic flash controller.

The invention claimed is:

1. A solid-state image pickup element comprising:
a pixel unit which converts light into electric signals;
an A/D converter which converts the electric signals read from the pixel unit into digital signals;
an optical communication unit which converts the digital signals digitalized by the A/D converter into optical signals and outputs the optical signals;
a timing generator which generates a synchronization signal supplied to synchronize operation of the pixel unit, the A/D converter, and the optical communication unit, the synchronization signal originating independently of the optical signals; and
a controller which controls reading of signals.

2. The solid-state image pickup element according to claim 1, wherein the pixel unit, the A/D converter, the optical communication unit, the timing generator, and the controller are formed on a single substrate and integrated into a single chip.

3. The solid-state image pickup element according to claim 2, wherein a line used to supply a synchronization signal from the timing generator to the pixel unit, a line used to supply a synchronization signal from the timing generator to the A/D converter, and a line used to supply a synchronization signal from the timing generator to the optical communication unit all have a same line length.

4. The solid-state image pickup element according to claim 2, wherein, in the pixel unit, pixels which perform photoelectric conversion are arranged in a matrix, and the electric signals read from the pixels are converted into optical signals without compression.

5. The solid-state image pickup element according to claim 2, wherein an operation mode in which signals are read by selecting certain pixels from among all the pixels included in the pixel unit and an operation mode in which signals are read by selecting all the pixels included in the pixel unit in a predetermined order are switched from one to another using the controller.

6. The solid-state image pickup element according to claim 1, wherein the pixel unit, the A/D converter, the optical communication unit, the timing generator and the controller are interconnected by a bus.

7. The solid-state image pickup element according to claim 6, wherein the controller causes the timing generator to generate the synchronization signal when a signal is to be read.

8. An optical apparatus, comprising:
a solid-state image pickup element which converts incident light into electric signals; and
an optical element which accepts light to enter the solid-state image pickup element,
wherein the solid-state image pickup element includes
a pixel unit which converts the incident light into the electric signals,
an A/D converter which converts the electric signals read from the pixel unit into digital signals,
an optical communication unit which converts the digital signals digitalized by the A/D converter into optical signals and outputs the optical signals,
a timing generator which generates a synchronization signal used to synchronize operation of the pixel unit, the A/D converter, and the optical communication unit, the synchronization signal originating independently of the optical signals, and
a controller which controls reading of the electric signals, and
the pixel unit, the A/D converter, the optical communication unit, the timing generator, and the controller are formed on a single substrate and integrated as a single chip.

9. A signal processing system, comprising:
an optical apparatus including a solid-state image pickup element which converts incident light into electric signals and an optical element which accepts light to enter the solid-state image pickup element; and
a signal processing apparatus connected to the optical apparatus,
wherein the solid-state image pickup element includes
a pixel unit which converts the incident light into the electric signals,
an A/D converter which converts the electric signals read from the pixel unit into digital signals,
an optical communication unit which converts the digital signals digitalized by the A/D converter into optical signals and outputs the optical signals, a timing generator which generates a synchronization signal used to synchronize operation of the pixel unit, the A/D converter, and the optical communication unit, the synchronization signal originating independently of the optical signals, and a controller which controls reading of signals, and the signal processing apparatus includes an optical communication unit which receives the optical signals output from the optical communication unit included in the solid-state image pickup element, a reading controller which controls reading of signals from the pixel unit in the solid-state image pickup element, and a signal processor which processes the signals which have been read from the pixel nit and which are input from the solid-state image pickup element through optical communication.

10. The signal processing system according claim 9, wherein, when a power supply of the signal processing apparatus is turned on, power-supply control is performed such that electric power is supplied to the optical communication unit of the signal processing apparatus before the electric power is supplied to the solid-state image pickup element, and thereafter, the electric power is supplied to the optical communication unit of the solid-state image pickup element before the electric power is supplied to the pixel unit, and when the power supply of the signal processing apparatus is turned off, power-supply control is performed such that supply of the electric power to the pixel unit of the solid-state image pickup element is stopped before supply of the electric power to the optical communication unit of the solid-state image pickup element is stopped, and thereafter, supply of the electric power to the solid-state image pickup element is stopped before supply of the electric power to the optical communication unit of the signal processing apparatus is stopped.

11. The signal processing system according to claim 9, wherein an operation mode in which signals are read by selecting certain pixels from among all pixels included in the pixel unit and an operation mode in which signals are read by selecting all the pixels included in the pixel unit in a predetermined order are switched from one to another in the solid-state image pickup element, and the signal processing apparatus outputs an instruction for selecting one of the operation modes to be executed in the solid-state image pickup element in accordance with an operation performed using an operating unit.

12. A method comprising:

generating electric signals based on light incident on a pixel unit;

converting the electric signals into digital signals in an A/D converter;

converting the digital signals into optical signals in an optical communication unit;

outputting the optical signals from the optical communication unit; and generating, in a timing generator, a synchronization signal to synchronize operation of the pixel unit, A/D converter and optical communication unit, wherein the synchronization signal originates independently of the optical signals.

* * * * *